United States Patent
Chen et al.

(10) Patent No.: US 12,532,240 B2
(45) Date of Patent: Jan. 20, 2026

(54) METHOD AND DEVICE USED FOR WIRELESS COMMUNICATION

(71) Applicant: BUNKER HILL TECHNOLOGIES LLC, Allen, TX (US)

(72) Inventors: Yu Chen, Shanghai (CN); Xiaobo Zhang, Shanghai (CN)

(73) Assignee: BUNKER HILL TECHNOLOGIES LLC, Allen, TX (US)

(*) Notice: Subject to any disclaimer, the term of this patent is extended or adjusted under 35 U.S.C. 154(b) by 388 days.

(21) Appl. No.: 18/113,596

(22) Filed: Feb. 23, 2023

(65) Prior Publication Data

US 2023/0199599 A1   Jun. 22, 2023

Related U.S. Application Data

(63) Continuation of application No. PCT/CN2022/127294, filed on Oct. 25, 2022.

(30) Foreign Application Priority Data

Oct. 26, 2021 (CN) .......................... 202111246083.9

(51) Int. Cl.
  *H04W 36/30* (2009.01)
  *H04W 36/00* (2009.01)
  *H04W 76/10* (2018.01)

(52) U.S. Cl.
  CPC ........ *H04W 36/30* (2013.01); *H04W 36/0011* (2013.01); *H04W 76/10* (2018.02)

(58) Field of Classification Search
  CPC ................. H04W 40/22; H04W 76/14; H04W 36/0011; H04W 48/16; H04W 48/20; H04W 76/27; H04W 36/30; H04W 60/00; H04W 76/10; H04W 68/005; H04W 88/04; Y02D 30/70
  See application file for complete search history.

(56) References Cited

U.S. PATENT DOCUMENTS

| | | | |
|---|---|---|---|
| 11,903,058 B2 * | 2/2024 | Cheng | H04W 76/27 |
| 12,356,369 B2 * | 7/2025 | Agiwal | H04W 76/28 |
| 2019/0159018 A1 | 5/2019 | Basu Mallick et al. | |

(Continued)

FOREIGN PATENT DOCUMENTS

WO   2021163894 A1   8/2021

OTHER PUBLICATIONS

International Search Report and Written Opinion mailed Jan. 19, 2023, from the ISA/CN, for International Patent Application No. PCT/CN2022/127294 (filed Oct. 25, 2022), 13 pgs.

(Continued)

*Primary Examiner* — Khawar Iqbal
(74) *Attorney, Agent, or Firm* — Ascenda Law Group, PC

(57) ABSTRACT

A method and a device for wireless communications. A first node enters a first state in response to any condition in a first condition set being satisfied, and performs a first operation set in the first state. The first node moves from the first state to a second state in response to any condition in a second condition set being satisfied. The first node moves from the first state to any cell-selection state in response to any condition in a third condition set being satisfied. By receiving a first message and a first signal, the first node can determine the state in a rational way.

20 Claims, 9 Drawing Sheets

(56) References Cited

U.S. PATENT DOCUMENTS

| | | | | |
|---|---|---|---|---|
| 2023/0077496 | A1* | 3/2023 | Cheng | H04W 76/19 |
| | | | | 370/328 |
| 2023/0156535 | A1* | 5/2023 | Chen | H04W 36/0058 |
| | | | | 455/436 |
| 2024/0007908 | A1* | 1/2024 | Wei | H04W 88/04 |
| 2024/0015659 | A1* | 1/2024 | Zhou | H04B 7/18513 |
| 2024/0214883 | A1* | 6/2024 | Shrivastava | H04W 76/27 |
| 2024/0357695 | A1* | 10/2024 | Cheng | H04W 76/27 |
| 2024/0373403 | A1* | 11/2024 | Zhang | H04W 36/03 |
| 2025/0261042 | A1* | 8/2025 | Fujishiro | H04W 28/0864 |

OTHER PUBLICATIONS

International Preliminary Report on Patentability issued Apr. 30, 2024, from The International Bureau of WIPO, for International Patent Application No. PCT/CN2022/127294 (filed Oct. 25, 2022), 10 pgs.

Huawei et al., "Remaining issues on relay selection and reselection", HiSilicon, 3GPP TSG RAN WG2 Meeting #114-e, R2-2106160, Electronic Meeting, May 19-May 27, 2021, 4 pgs.

"Remaining issues on Relay (re)selection", VIVO, 3GPP TSG-RAN W62 Meeting #114 electronic, R2-2104959, E-Meeting, May 19-May 27, 2021, 7 pgs.

"3rd Generation Partnership Project; Technical Specification Group Radio Access Network; NR; Physical channels and modulation (Release 16)", 3GPP, 3rd Generation Partnership Project, 3GPP TS 38.211 V16.5.0 (Mar. 2021), Technical Specification, 134 pgs.

"3rd Generation Partnership Project; Technical Specification Group Radio Access Network; NR; Physical layer procedures for control (Release 16)", 3GPP, 3rd Generation Partnership Project, 3GPP TS 38.213 V16.5.0 (Mar. 2021), Technical Specification, 183 pgs.

"3rd Generation Partnership Project; Technical Specification Group Radio Access Network; NR; User Equipment (UE) procedures in Idle mode and RRC Inactive state (Release 16)", 3rd Generation Partnership Project, 3GPP TS 38.304 V16.4.0 (Mar. 2021), Technical Specification, 39 pgs.

"3rd Generation Partnership Project; Technical Specification Group Radio Access Network; NR; Radio Resource Control (RRC) protocol specification (Release 16)", 3GPP, 3rd Generation Partnership Project, 3GPP TS 38.331 V16.5.0 (Jun. 2021), Technical Specification, 959 pgs.

* cited by examiner

METHOD AND DEVICE USED FOR WIRELESS COMMUNICATION

CROSS REFERENCE TO RELATED APPLICATIONS

This application is a continuation of International Patent Application No. PCT/CN2022/127294, filed on Oct. 25, 2022, which claims the priority benefit of Chinese Patent Application No. 202111246083.9, filed on Oct. 26, 2021, the full disclosure of which is incorporated herein by reference.

BACKGROUND

Technical Field

The present application relates to transmission methods and devices in wireless communication systems, and in particular to a method and device for sidelink communications and relay, cell selection and re-selection in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum (NAS), and lower traffic interruption and call drop rate, and support to lower power consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), and Device to Device (D2D), Unlicensed Spectrum communications, and monitoring on UE communication quality, network plan optimization, Non Terrestrial Network (NTN) and Terrestrial Network (TN), Dual connectivity system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. The UE's connection with the network can be achieved directly or by relaying.

As the number and complexity of system scenarios increases, more and more requests have been made on reducing interruption rate and latency, strengthening reliability and system stability, increasing the traffic flexibility and power conservation, and in the meantime the compatibility between different versions of systems shall be taken into account for system designing.

The 3GPP standardization organization has worked on 5G standardization to formulate a series of specifications, such as 38.304, 38.211, 38.213, and 38.331.

SUMMARY

The relay can be used in various communication scenarios, for instance, when a UE is not within coverage of a cell, it can be accessible to the network via the relay, where the relay node can be another UE (U2N relay UE). The relay generally includes L3 relay and L2 relay, both of which provide the service of access to the network for a U2N remote UE via a relay node. The L3 relay is transparent to the access network, namely, a remote UE only establishes connection with the core network, so the access network cannot recognize whether data is from a remote node or a relay node; while in the L2 relay, a remote node can be RRC connected with an access network (RAN), where the RAN can manage the remote node, and a radio bearer (RB) can be established between the RAN and the remote node. In the L2 relay, a remote node shall establish an RRC connection with an access network via a relay node. When in different RRC states, including RRC_CONNECTED, RRC_IDLE, and RRC_INACTIVE, and especially in a non-RRC-connected state a UE is required to perform cell selection or re-selection in a specific way, which is mainly realized by means of a set of conditions for transition from one state to another. But the introduction of relay, in particular the L2 relay enables a remote node to receive a system message from a cell even out of its coverage, as well as to receive its paging, though in a way different from being camped on the cell. Therefore, the occurrence of L2 relay will lead to contradiction between the existing cell selection and re-selection methods, hence the need for the establishment of a more accurate and robust cell selection/re-selection mechanism, as a solution to mobility management of the non-RRC-connected state.

To address the above problem, the present application provides a solution.

It should be noted that if no conflict is incurred, embodiments in any node in the present application and the characteristics of the embodiments are also applicable to any other node, and vice versa. What's more, the embodiments in the present application and the characteristics in the embodiments can be arbitrarily combined if there is no conflict.

The present application provides a method in a first node for wireless communications, comprising:

entering a first state, as a response to any condition in a first condition set being satisfied; and performing a first operation set in the first state;

moving from the first state to a second state, as a response to any condition in a second condition set being satisfied; and as a response to any condition in a third condition set being satisfied, moving from the first state to any cell selection state;

herein, the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving a paging message from a registered PLMN or a SNPN; the third condition set at least comprises one condition of performing re-selection assessment, through which neither a suitable cell nor a suitable L2 relay is found; in the second state, an RRC connection is established.

In one embodiment, a problem to be solved in the present application includes: how to support cell selection and cell re-selection in scenarios relating to the relay, particularly the L2 relay, in an appropriate state and provided with an appropriate condition for a state transition.

In one embodiment, an advantage of the above method includes: The method of cell selection and cell re-selection proposed by the present application is applicable to scenarios in which L2 relay is used by the UE, especially those using cell selection and re-selection relayed via L2 in non-RRC connected state.

Specifically, according to one aspect of the present application, the first state is a camped normally state, the first condition set comprising a condition of finding a suitable cell.

Specifically, according to one aspect of the present application, performing cell re-selection assessment and finding a suitable cell; and as a response to the action of performing cell re-selection assessment and finding a suitable cell, moving from the first state to a camped normally state;

herein, when in the second state, the RRC connection is established via the first relay; the second state is a state other than a connected mode, where when in the connected mode, the RRC connection is directly established without being relayed.

Specifically, according to one aspect of the present application, receiving a first signaling; and as a response to receiving the first signaling, moving from the second state to a connected mode;

herein, when in the second state, the RRC connection is established via the first relay; when in the connected mode, the RRC connection is directly established without being relayed.

Specifically, according to one aspect of the present application, before the action of entering the first state, performing cell re-selection assessment and having found no cell that satisfies a first quality criterion;

herein, the first state is a camped normally state; under the assumption that L2 relay is not used: a suitable cell is a cell that satisfies the first quality criterion and the condition for entering the camped normally state includes a suitable cell being found, and the first node entering the any cell selection state.

Specifically, according to one aspect of the present application, before the action of moving from the first state to a second state, receiving a first signal on a sidelink, the first signal being used to indicate a first cell, and determining the first cell to be a camped cell of the first node;

herein, when the first relay is in an RRC connected state, the first cell is a PCell of the first relay; when the first relay is not in an RRC connected state, the first cell is a serving cell of the first relay.

Specifically, according to one aspect of the present application, determining a first cell to be a suitable cell according to a second criterion; the first cell does not satisfy a first quality criterion;

herein, under the assumption that L2 relay is not used, a suitable cell is a cell that satisfies the first quality criterion; the second criterion includes: the first relay is a suitable L2 relay, and the first cell is a suitable cell for the first relay, the first cell is not barred, the first cell belonging to a selected or registered or equivalent PLMN; the condition for entering the first state includes finding a suitable cell.

Specifically, according to one aspect of the present application, before the action of entering the first state, performing cell re-selection assessment and having found no cell that satisfies a first quality criterion;

herein, a suitable cell is a cell that satisfies the first quality criterion.

Specifically, according to one aspect of the present application, as a response to any condition in a fourth condition set being satisfied, moving from the any cell selection state to the second state;

herein, the fourth condition set at least comprises: a condition of finding a suitable L2 relay and needing to establish an RRC connection.

Specifically, according to one aspect of the present application, the first node is a UE.

Specifically, according to one aspect of the present application, the first node is a terminal of Internet of Things (IoT).

Specifically, according to one aspect of the present application, the first node is a relay.

Specifically, according to one aspect of the present application, the first node is a vehicle-mounted terminal.

Specifically, according to one aspect of the present application, the first node is an aircraft.

The present application provides a first node for wireless communications, comprising:
  a first receiver, entering a first state, as a response to any condition in a first condition set being satisfied; and performing a first operation set in the first state; and
  a first processor, moving from the first state to a second state, as a response to any condition in a second condition set being satisfied; and as a response to any condition in a third condition set being satisfied, moving from the first state to any cell selection state;
  herein, the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving a paging message from a registered PLMN or SNPN; the third condition set at least comprises one condition of performing re-selection assessment, through which neither a suitable cell nor a suitable L2 relay is found; in the second state, an RRC connection is established.

In one embodiment, compared with the prior art, the present application is advantageous in the following aspects:
  To achieve a better integration of relay selection and re-selection with cell re-selection, which will not have too much mutual influence on each other, thus avoiding unnecessary complexity.
  To prevent the contradiction between generally used methods of cell selection and cell re-selection in scenarios using the L2 relay.
  A remote UE can be normally camped on a cell, and can enter an RRC connected mode in any cell selection state.
  A remote UE can also perform cell selection or re-selection out of the coverage.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
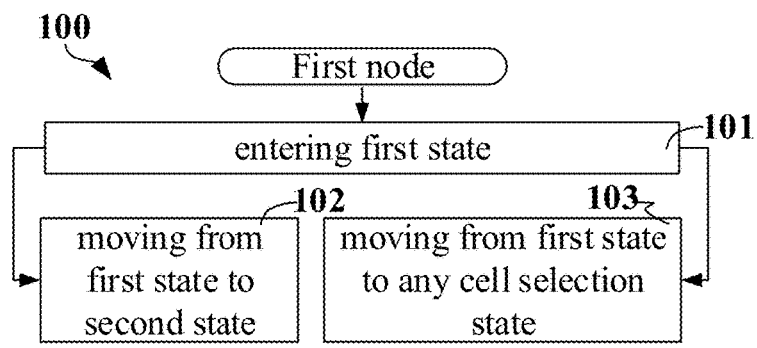
FIG. 1 illustrates a flowchart of entering a first state, moving from a first state to a second state, and moving from a first state to any cell selection state according to one embodiment of the present application.

Embodiment 1 illustrates a flowchart of entering a first state, moving from a first state to a second state, and moving from a first state to any cell selection state according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, the first node in the present application enters a first state in step 101; moves from the first state to a second state in step 102; and moves from the first state to any cell selection state in step 103;

herein, the first node enters a first state as a response to any condition in a first condition set being satisfied; and performs a first operation set in the first state; moves from the first state to a second state, as a response to any condition in a second condition set being satisfied; and as a response to any condition in a third condition set being satisfied, moves from the first state to any cell selection state; the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving a paging message from a registered PLMN or SNPN; the third condition set at least comprises one condition of performing re-selection assessment, through which neither a suitable cell nor a suitable L2 relay is found; in the second state, an RRC connection is established.

In one embodiment, the first node is a User Equipment (UE).

In one embodiment, the first node is not running in an SNPN Access Mode (AM).

In one embodiment, a direct path refers to a UE-to-Network (U2N) transmission path, so transmitting through the direct path means that data is transmitted without being relayed between a remote UE and the network in U2N transmission.

In one subembodiment, the data comprises higher-layer data and signaling.

In one subembodiment, the data comprises an RRC signaling.

In one subembodiment, the data comprises a bit string or a bit block.

In one subembodiment, the data only comprises signaling or data borne by a radio bearer (RB).

In one embodiment, an indirect path refers to a UE-to-Network (U2N) transmission path, so transmitting through the indirect path means that data is forwarded by a U2N relay UE between a remote UE and the network in U2N transmission.

In one subembodiment, the data comprises higher-layer data and signaling.

In one subembodiment, the data comprises an RRC signaling.

In one subembodiment, the data comprises a bit string or a bit block.

In one subembodiment, the data only comprises signaling or data borne by a radio bearer (RB).

In one embodiment, a U2N relay UE refers to a UE providing the function of supporting connections between a U2N remote UE and the network.

In one embodiment, a U2N remote UE refers to a UE that needs to be relayed by a U2N relay UE in communication with the network.

In one embodiment, a U2N remote UE refers to a UE that needs to be relayed by a U2N relay UE in communication with the network.

In one embodiment, a U2N remote UE refers to a UE in communication with the network that supports relaying services.

In one embodiment, a U2N relay is a U2N relay UE.

In one embodiment, when transmitting to and receiving from the network unicast services, the U2N relay and the U2N remote node are both in an RRC connected state.

In one embodiment, when the U2N remote UE is in an RRC Idle state or an RRC Inactive state, the U2N relay UE can be in any RRC state, i.e., RRC Connected state, RRC Idle state or RRC Inactive state.

In one embodiment, not transmitting through a direct path is equivalent to transmitting through an inactive path.

In one embodiment, not transmitting through a direct path includes transmitting via a relay.

In one embodiment, transmitting through a direct path is or includes not transmitting via a relay.

In one embodiment, transmitting through a direct path is or includes not forwarding via a relay.

In one embodiment, the U2N relay UE is a UE providing the functionality of supporting connectivity to the network for the U2N remote UE.

In one subembodiment, the U2N relay UE is a UE.

In one subembodiment, the U2N relay UE provides the U2N remote UE with the service of relay to the network.

In one embodiment, the U2N remote UE is a UE in communication with the network via the U2N relay UE.

In one embodiment, a direct mode is a mode using the direct path.

In one embodiment, the direct mode is a mode in which a U2N remote UE is in communication with the network using the direct path.

In one embodiment, the direct mode is a mode in which a U2N remote UE transmits an RRC signaling or establishes an RRC connection to the network using the direct path.

In one embodiment, an indirect mode is a mode using the indirect path.

In one embodiment, the indirect mode is a mode using the indirect path.

In one embodiment, the indirect mode is a mode in which a U2N remote UE is in communication with the network using the indirect path.

In one embodiment, the indirect mode is a mode in which a U2N remote UE transmits an RRC signaling or establishes an RRC connection to the network using the indirect path.

In one embodiment, a serving cell is or includes a cell that the UE is camped on. Performing cell search includes that the UE searches for a suitable cell for a selected Public Land Mobile Network (PLMN) or a Stand-alone Non-Public Network (SNPN), selects the suitable cell to provide available services, and monitors a control channel of the suitable cell, where the whole procedure is defined to be camped on the cell; in other words, relative to this UE, the cell being camped on is seen as a serving cell of the UE. Being camped on a cell in either RRC Idle state or RRC Inactive state is advantageous in the following aspects: enabling the UE to receive system information from a PLMN or an SNPN; after registration, if a UE hopes to establish an RRC connection or resume a suspended RRC connection, the UE can perform an initial access on a control channel of the camped cell to achieve such purpose; the network can page the UE, so that the UE can receive notifications from the Earthquake and Tsunami Warning System (ETWS) and the Commercial Mobile Alert System (CMAS).

In one embodiment, for a U2N remote node, a serving cell is or includes a cell which the U2N relay is camped on or is connected with.

In one embodiment, for a UE in RRC connected state without being configured with carrier aggregation/dual connectivity (CA/DC), there is only one serving cell that comprises a master cell. For a UE in RRC connected state that is configured with carrier aggregation/dual connectivity (CA/DC), a serving cell is used for indicating a cell set comprising a Special Cell (SpCell) and all secondary cells. A Primary Cell is a cell in a Master Cell Group (MCG), i.e., an MCG cell, working on the primary frequency, and the UE performs an initial connection establishment procedure or initiates a connection re-establishment on the Primary Cell. For dual connectivity (DC) operation, a special cell refers to a Primary Cell (PCell) in an MCG or a Primary SCG Cell (PSCell) in a Secondary Cell Group (SCG); otherwise, the special cell refers to a PCell.

In one embodiment, working frequency of a Secondary Cell (SCell) is secondary frequency.

In one embodiment, separate contents in information elements (IEs) are called fields.

In one embodiment, Multi-Radio Dual Connectivity (MR-DC) refers to dual connectivity with E-UTRA and an NR node, or between two NR nodes.

In one embodiment, in MR-DC, a radio access node providing a control plane connection to the core network is a master node, where the master node can be a master eNB, a master ng-eNB or a master gNB.

In one embodiment, an MCG refers to a group of serving cells associated with a master node in MR-DC, including a SpCell, and optionally, one or multiple SCells.

In one embodiment, a PCell is a SpCell of an MCG.

In one embodiment, a PSCell is a SpCell of an SCG.

In one embodiment, in MR-DC, a radio access node not providing a control plane connection to the core network but providing extra resources for the UE is a secondary node. The secondary node can be an en-gNB, a secondary ng-eNB or a secondary gNB.

In one embodiment, in MR-DC, a group of serving cells associated with a secondary node is a secondary cell group (SCG), including a SpCell and, optionally, one or multiple SCells.

In one embodiment, an Access Stratum (AS) functionality that enables Vehicle-to Everything (V2X) communications defined in 3 GPP TS 23.285 is V2X sidelink communication, where the V2X sidelink communication occurs between nearby UEs, using E-UTRA technology but not traversing network node.

In one embodiment, an Access Stratum (AS) functionality that at least enables Vehicle-to Everything (V2X) communications defined in 3GPP TS 23.287 is NR sidelink communication, where the NR sidelink communication occurs between two or nearby UEs, using NR technology but not traversing network node.

In one embodiment, the sidelink refers to a UE-to-UE direct communication link that uses sidelink resource allocation mode, a physical signal or channel, and physical layer procedures.

In one embodiment, not being or not located within coverage is equivalent to being out of coverage.

In one embodiment, being within coverage is equivalent to being covered.

In one embodiment, being out of coverage is equivalent to being uncovered.

In one embodiment, the first node is a U2N remote node.

In one embodiment, PDCP entities corresponding to radio bearers (RBs) terminated between a UE and the network are respectively located within the UE and the network.

In one embodiment, the direct path refers to a direct path or communication link or channel or bearer used for the direct-link transmission.

In one embodiment, the direct-path transmission means that data borne by at least Signaling radio bearer (SRB) between the UE and network does not go through relaying or forwarding of other nodes.

In one embodiment, the direct-path transmission means that RLC bearers associated with at least Signaling radio bearer (SRB) between the UE and network are respectively terminated at the UE and the network.

In one embodiment, the direct-path transmission means that RLC entities associated with at least Signaling radio bearer (SRB) between the UE and network are respectively terminated at the UE and the network.

In one embodiment, the direct-path transmission means that there is a direct communication link between the UE and the network.

In one embodiment, the direct-path transmission means that there is a Uu interface between the UE and the network.

In one embodiment, the direct-path transmission means that there is a MAC layer of a Uu interface, and the MAC layer of the Uu interface carries an RRC signaling.

In one embodiment, the direct-path transmission means that there is a physical layer of a Uu interface between the UE and the network.

In one embodiment, the direct-path transmission means that there is a logical channel and/or a transport channel between the UE and the network.

In one embodiment, the indirect path refers to an indirect path or communication link or channel or bearer used for the indirect-link transmission.

In one embodiment, the indirect-path transmission means that data borne by at least Signaling radio bearer (SRB) between the UE and network goes through relaying or forwarding of other nodes.

In one embodiment, the indirect-path transmission means that RLC bearers associated with at least Signaling radio bearer (SRB) between the UE and network are respectively terminated at the UE and the other node, as well as the other node and the network.

In one embodiment, the indirect-path transmission means that RLC entities associated with at least Signaling radio bearer (SRB) between the UE and network are respectively terminated at the UE and the other node, as well as the other node and the network.

In one embodiment, the indirect-path transmission means that there is no direct communication link between the UE and the network.

In one embodiment, the indirect-path transmission means that there isn't a MAC layer of a Uu interface between the UE and the network.

In one embodiment, the indirect-path transmission means that there isn't a physical layer of a Uu interface between the UE and the network.

In one embodiment, the indirect-path transmission means that there is neither a logical channel nor a transport channel between the UE and the network.

In one embodiment, the network includes a Radio Access Network (RAN) and/or a serving cell and/or a base station.

In one embodiment, the phrase of at least SRB includes at least one of {SRB0, SRB1, SRB2, SRB3}.

In one embodiment, the phrase of at least SRB includes both an SRB and a data radio bearer (DRB).

In one embodiment, the UE in the phrase of the UE and the network includes the first node.

In one embodiment, the other nodes include a relay node or other UE.

In one embodiment, when using a direct path for transmission, the UE can transmit a physical layer signaling to the network; when using an indirect path for transmission, the UE cannot transmit or directly transmit a physical layer signaling to the network.

In one embodiment, when using a direct path for transmission, the UE can transmit a MAC CE to the network; when using an indirect path for transmission, the UE cannot transmit or directly transmit a MAC CE to the network.

In one embodiment, when using a direct path for transmission, there isn't any other protocol layer between a PDCP layer and an RLC layer of the first node; when using an indirect path for transmission, there is at least one other protocol layer between a PDCP layer and an RLC layer of the first node.

In one subembodiment, the other protocol layer is or includes an adaption layer.

In one embodiment, when using a direct path for transmission, the network directly schedules uplink transmission of the first node via DCI; when using an indirect path for transmission, the network does not directly schedule uplink transmission of the first node via DCI.

In one embodiment, when using a direct path for transmission, an SRB of the first node is associated with an RLC entity and/or an RLC layer and/or an RLC bearer; when using an indirect path for transmission, an SRB of the first node is associated with an RLC entity of a PC5 interface.

In one embodiment, when using a direct path for transmission, a mapping relation exists between an SRB of the first node and an RLC entity of a Uu interface; when using an indirect path for transmission, a mapping relation exists between an SRB of the first node and an RLC entity of a PC5 interface.

In one embodiment, there only exists a direct path or an indirect path between the first node and the network.

In one embodiment, the phrase of transiting from a direct path to an indirect path means: starting to use an indirect path and stopping using a direct path.

In one embodiment, the phrase of transiting from a direct path to an indirect path means: starting to use an indirect path for transmission and stopping using a direct path for transmission.

In one embodiment, the phrase of transiting from a direct path to an indirect path means: turning a direct-path transmission into an indirect-path transmission.

In one embodiment, the phrase of transiting from a direct path to an indirect path means: the first node associates an SRB with an RLC entity of a PC5 interface and meanwhile releases an RLC entity of a Uu interface associated with the SRB.

In one embodiment, the phrase of transiting from a direct path to an indirect path means: the first node associates an SRB and a DRB with an RLC entity of a PC5 interface and meanwhile releases an RLC entity of a Uu interface associated with the SRB and the DRB.

In one embodiment, the relay in the present application is a U2N relay UE.

In one embodiment, the re-selection assessment includes cell re-selection assessment and relay re-selection assessment.

In one embodiment, the re-selection assessment includes relay re-selection assessment.

In one embodiment, the re-selection assessment includes cell re-selection assessment.

In one embodiment, the first node cannot transit directly from the any cell selection state to the second state.

In one embodiment, the first state and the second state are both staying states.

In one subembodiment, relative to the long-staying state, the non-long-staying state refers to a state entered for the purpose of performing cell selection or re-selection, and no matter whether there is a suitable cell being found in the non-long-staying state, exiting from the non-long-staying state and entering another state.

In one embodiment, the first state is a camped normally state.

In one embodiment, the first state is not a camped normally state.

In one embodiment, the first state is a camped normally state via relay.

In one embodiment, the first state is an indirect camped state.

In one embodiment, names of the first state include relay.

In one embodiment, names of the first state include camp.

In one embodiment, names of the first state include indirect.

In one embodiment, the second state is a Connected mode.

In one embodiment, the second state is not a Connected mode.

In one embodiment, the second state is an indirectly Connected mode.

In one embodiment, the second state is an indirect Connected mode.

In one embodiment, the second state is a state or mode of being connected via relay.

In one embodiment, names of the second state include relay.

In one embodiment, names of the second state include Connected.

In one embodiment, when the first node is in the first state, the first node determines according to the second condition set and the third condition set whether it will enter the second state or the any cell selection state.

In one embodiment, the any cell selection state is applied to states of RRC_IDLE and RRC_INACTIVE; in the any cell selection state, the UE shall perform a cell selection procedure to find a suitable cell, if no suitable cell is found in all UE-supported radio access technologies (RATs) and all bands through the cell selection procedure, and the UE is not in SNPN AM, the UE shall attempt to find an acceptable cell of any PLMN to camp on; first of all, the UE shall make the attempt on all UE-supported RATs and search for high-quality cells.

In one subembodiment, the UE does not support L2 U2N relay.

In one subembodiment, the UE finds no suitable L2 U2N relay.

In one embodiment, if a UE is not camped on any cell, the UE shall be in the any cell selection state.

In one subembodiment, the UE finds no suitable L2 U2N relay.

In one subembodiment, the UE does not support L2 U2N relay.

In one embodiment, a UE in any cell selection state shall perform relay selection to find a suitable relay.

In one subembodiment, the relay is a L2 U2N relay.

In one embodiment, when the first node is in the first state, and any condition in the second condition set is satisfied, the first node transits from the first state to the second state.

In one subembodiment, the first node transmits from the first state to the second state without going through any other state.

In one embodiment, when the first node is in the first state, and any condition in the third condition set is satisfied, the first node transits from the first state to the any cell selection state.

In one subembodiment, the first node transmits from the first state to the any cell selection state without going through any other state.

In one embodiment, the first state can be directly switched to a connected mode.

In one embodiment, the first relay is a L2 U2N relay.

In one embodiment, the first relay is a U2N relay UE.

In one embodiment, the first relay is a L2 relay.

In one embodiment, any operation in the first operation set has a chance of being implemented.

In one embodiment, the action of listening over paging via a first relay includes that the first node indicates to the first relay an identity of the first node used for identifying the paging.

In one subembodiment, the identity used for identifying the paging includes a P-RNTI.

In one subembodiment, the identity used for identifying the paging includes an I-RNTI.

In one subembodiment, the identity used for identifying the paging includes a full I-RNTI.

In one subembodiment, the identity used for identifying the paging includes an ng-5G-S-TMSI.

In one subembodiment, the identity used for identifying the paging is included in a paging message for paging the first node transmitted by the base station.

In one subembodiment, the identity used for identifying the paging is included in a pagingRecord in a paging message for paging the first node transmitted by the base station.

In one embodiment, the action of listening over paging via a first relay includes that the first node indicates to the first relay a paging parameter of the first node.

In one subembodiment, the paging parameter includes paging periodicity.

In one subembodiment, the paging parameter includes periodicity of Discontinuous Reception (DRX).

In one subembodiment, the paging parameter includes a parameter used for determining a paging slot.

In one subembodiment, the paging parameter includes an offset used for determining a paging slot.

In one subembodiment, the paging parameter includes a random value used for determining a paging slot.

In one embodiment, the action of listening over related system information via the first relay includes receiving at least essential system information via the first relay.

In one subembodiment, the essential system information comprises at least partial bits or all bits comprised in a master information block (MIB).

In one subembodiment, the essential system information comprises at least partial bits or all bits comprised in a SIB1.

In one subembodiment, the essential system information comprises at least partial bits or all bits comprised in a SIB12.

In one embodiment, the action of listening over related system information via the first relay includes that the first relay monitors a paging message for the first node and forwards at least part of the received paging message to the first node.

In one embodiment, the action of listening over related system information via the first relay includes: the first node receiving system information forwarded by the first relay.

In one subembodiment, the system information comprises at least one system information block (SIB).

In one subembodiment, the action of receiving system information forwarded by the first relay includes receiving at least one SIB.

In one subembodiment, the first relay forwards the system information via a discovery message.

In one subembodiment, the first relay forwards the system information via a PC5-S message.

In one subembodiment, the first relay forwards the system information via a PC5-RRC message.

In one subembodiment, the first relay forwards the system information according to a SIB which the first node is interested in or requests as indicated by the first node.

In one subembodiment, upon reception of an indication of the first node about making a request for system information, the first relay makes a request for and/or receives the system information.

In one embodiment, the action of listening over related system information via the first relay includes: the first node receiving an indication transmitted by the first relay about the change to system information.

In one subembodiment, system information corresponding to the indication about the change to system information and the indication itself are simultaneously transmitted by the first relay.

In one subembodiment, the first node makes a request to the first relay for system information according to the indication about the change to system information.

In one subembodiment, the first node makes a request to the first relay for system information after receiving the indication about the change to system information.

In one embodiment, the first operation set comprises listening over a Short Message via the first relay.

In one subembodiment, the Short Message is not SMS.

In one subembodiment, a transmitter of the Short Message includes a cell or a base station, the Short Message being carried by downlink control information (DCI) when transmitted through a Uu interface.

In one subembodiment, the Short Message comprises 8 bits.

In one subembodiment, a second bit in the Short Message is used for indicating an alert.

In one subembodiment, a second bit in the Short Message is used for indicating the Earthquake and Tsunami Warning System (ETWS) and the Commercial Mobile Alert Service (CMAS).

In one subembodiment, a first bit in the Short Message does not indicate an alert.

In one subembodiment, a first bit in the Short Message indicates a change to system information.

In one subembodiment, a third bit in the Short Message indicates a stop of paging monitoring.

In one subembodiment, the first relay monitors the Short Message transmitted by a cell or a base station for the first node according to a P-RNTI of the first node.

In one embodiment, the first state is only applicable to RRC_IDLE and RRC_INACTIVE states.

In one embodiment, the first state is only applicable to a non-RRC-connected state, i.e., any state other than the RRC_CONNECTED state.

In one embodiment, the first operation set comprises performing a necessary measurement about cell selection and/or selection.

In one embodiment, the first operation set comprises performing a necessary measurement about relay selection and/or selection.

In one embodiment, cell selection/re-selection in the present application refers to cell selection and/or cell re-selection.

In one embodiment, cell selection/re-selection in the first state and the camped normally state refers to cell re-selection.

In one embodiment, cell selection/re-selection in the any cell selection state refers to cell selection.

In one embodiment, when using a L2 U2N relay, in the first state the first node can perform cell selection.

In one embodiment, when using a L2 U2N relay, in the first state the first node only performs cell selection rather than cell re-selection.

In one embodiment, when using a L2 U2N relay, in the camped normally state the first node can perform cell selection.

In one subembodiment, when using a L2 U2N relay, the first node only performs cell selection rather than cell re-selection in the camped normally state.

In one embodiment, when not using L2 U2N relay, the first node only performs cell re-selection in the camped normally state.

In one embodiment, the action of performing re-selection assessment includes performing a cell selection and/or re-selection procedure.

In one subembodiment, the triggering condition for performing the cell re-selection procedure includes internal triggering within the first node to meet the requirement of performance.

In one subembodiment, the triggering condition for performing the cell re-selection procedure includes receiving information about the change to the cell re-selection assessment procedure on a broadcast control channel (BCCH).

In one subembodiment, the triggering condition for performing the cell re-selection procedure includes receiving a message of failure of the first relay.

In one subembodiment, the triggering condition for performing the cell re-selection procedure includes receiving a message of radio link failure (RLF) of the first relay.

In one subembodiment, the triggering condition for performing the cell re-selection procedure includes receiving an indication of handover of the first relay.

In one subembodiment, the triggering condition for performing the cell re-selection procedure includes receiving an indication that a cell which the first relay is camped on is unavailable.

In one subembodiment, the triggering condition for performing the cell re-selection procedure includes receiving an indication of no coverage of the first relay.

In one subembodiment, the triggering condition for performing the cell re-selection procedure includes receiving an indication of link release of the first relay.

In one subembodiment, the triggering condition for performing the cell re-selection procedure includes receiving an indication of the first relay being barred.

In one subembodiment, the triggering condition for performing the cell re-selection procedure includes receiving an indication from the first relay that the first relay enters any cell selection state.

In one subembodiment, an indication that the first relay enters a state of being camped on any cell is received from the first relay.

In one subembodiment, the triggering condition for performing the cell re-selection procedure includes that a link to the first relay is failed or released.

In one subembodiment, the triggering condition for performing the cell re-selection procedure includes that a link to the first relay cannot meet the QoS requirement.

In one subembodiment, the triggering condition for performing the cell re-selection procedure includes that a link to the first relay has quality lower than a threshold.

In one subembodiment, the triggering condition for performing the cell re-selection procedure includes that no message or feedback relating to keep alive message is received from the first relay.

In one subembodiment, the triggering condition for performing the cell re-selection procedure includes that the first relay is no longer suitable.

In one subembodiment, the triggering condition for performing the cell re-selection procedure includes that the first relay is no longer a suitable L2 U2N relay.

In one subembodiment, the triggering condition for performing the cell re-selection procedure includes that the cell on which the first node is camped is no longer suitable.

In one embodiment, the action of performing re-selection assessment includes performing a L2 U2N relay selection and/or re-selection procedure.

In one subembodiment, the triggering condition for performing a L2 U2N relay selection and/or re-selection procedure includes that the first relay is no longer a suitable L2 U2N relay.

In one subembodiment, the triggering condition for performing a L2 U2N relay selection and/or re-selection procedure includes that the current L2 U2N relay is no longer a suitable L2 U2N relay.

In one subembodiment, the triggering condition for performing a L2 U2N relay selection and/or re-selection procedure includes triggering due to internal factors of the first node.

In one subembodiment, the triggering condition for performing a L2 U2N relay selection and/or re-selection procedure includes that the cell on which the first node is camped is no longer suitable.

In one subembodiment, the triggering condition for performing a L2 U2N relay selection and/or re-selection procedure includes that the cell on which the first relay is camped is no longer suitable.

In one subembodiment, the triggering condition for performing a L2 U2N relay selection and/or re-selection procedure includes that the cell on which the first node is camped has quality lower than a threshold.

In one subembodiment, the triggering condition for performing a L2 U2N relay selection and/or re-selection procedure includes that a link between the first node and the first relay has quality lower than a threshold.

In one subembodiment, the triggering condition for performing a L2 U2N relay selection and/or re-selection procedure includes that the first node finds a suitable cell.

In one subembodiment, the triggering condition for performing a L2 U2N relay selection and/or re-selection procedure includes that the first node finds a cell whose quality is higher than a threshold.

In one subembodiment, the triggering condition for performing a L2 U2N relay selection and/or re-selection procedure includes that a link between the first node and the first relay is released or failed.

In one subembodiment, the triggering condition for performing a L2 U2N relay selection and/or re-selection procedure includes that the first relay indicates that the first node performs the L2 U2N relay selection or re-selection.

In one subembodiment, the triggering condition for performing a L2 U2N relay selection and/or re-selection procedure includes finding a L2 U2N relay with better signal quality.

In one subembodiment, the triggering condition for performing a L2 U2N relay selection and/or re-selection procedure includes that the first relay is barred.

In one subembodiment, the triggering condition for performing a L2 U2N relay selection and/or re-selection procedure includes that the first relay experiences a radio link failure (RLF).

In one subembodiment, the triggering condition for performing a L2 U2N relay selection and/or re-selection procedure includes that the first node transits from an RRC connected state.

In one subembodiment, the triggering condition for performing a L2 U2N relay selection and/or re-selection procedure includes that the first node transits from the second state.

In one subembodiment, the triggering condition for performing a L2 U2N relay selection and/or re-selection procedure includes that the first node enters any cell selection state.

In one subembodiment, the triggering condition for performing a L2 U2N relay selection and/or re-selection procedure includes that the first node enters a state of being camped on any cell.

In one subembodiment, the triggering condition for performing a L2 U2N relay selection and/or re-selection procedure includes arriving at a specific time.

In one subembodiment, the triggering condition for performing a L2 U2N relay selection and/or re-selection procedure includes entering a specific zone.

In one subembodiment, the triggering condition for performing a L2 U2N relay selection and/or re-selection procedure includes that a position relative to a specific reference point satisfies certain requirements.

In one subembodiment, the triggering condition for performing a L2 U2N relay selection and/or re-selection procedure includes that a position relative to two specific reference points satisfies certain requirements.

In one embodiment, the action of performing re-selection assessment includes a cell selection and/or re-selection assessment, as well as a L2 U2N relay selection and/or re-selection assessment.

In one subembodiment, when the first node finds a suitable cell but does not find any suitable L2 U2N relay, the first node then enters a camped normally state and is camped on the suitable cell found above.

In one subembodiment, when the first node finds no suitable cell but finds a suitable L2 U2N relay, the first node then enters the first state.

In one subembodiment, when the first node finds no suitable cell but finds a suitable L2 U2N relay, the first node then enters the first state and is camped on the suitable L2 U2N relay found above.

In one subembodiment, when the first node finds no suitable cell but finds a suitable L2 U2N relay, the first node then enters the first state and is camped on a PCell or serving cell of the suitable L2 U2N relay found above.

In one subembodiment, the first state is a camped normally state.

In one subembodiment, when the first node finds a suitable cell and also a suitable L2 U2N relay, then the first node selects between the suitable cell and the suitable L2 U2N relay according to its internal algorithm.

In one embodiment, a suitable L2 relay is a suitable L2 U2N relay.

In one embodiment, a suitable L2 relay is a relay that satisfies a second quality requirement.

In one subembodiment, the second quality requirement is or includes that a radio channel quality of a sidelink between the first node and a candidate relay is greater than or no less than a threshold.

In one subembodiment, the second quality requirement is or includes that a result of measuring an SL-RSRP is greater than or no less than a threshold.

In one subembodiment, the second quality requirement is or includes that a result of measuring an SD-RSRP is greater than or no less than a threshold.

In one subembodiment, the second quality requirement is for the quality of a radio channel between the first node and a candidate relay.

In one subembodiment, the second quality requirement is for the quality of a sidelink channel between the first node and a candidate relay.

In one subembodiment, the second quality requirement is for a result of measuring an SL-RSRP and/or SD-RSRP between the first node and a candidate relay.

In one embodiment, the suitable L2 relay is or includes a relay not being barred.

In one embodiment, the suitable L2 relay is or includes a L2 U2N relay.

In one embodiment, the suitable L2 relay is or includes a relay camped on what is a suitable cell.

In one embodiment, the suitable L2 relay is or includes: a relay of which a PCell is a suitable cell, the suitable relay being in an RRC connected state.

In one embodiment, the suitable L2 relay is or includes: a relay of which a serving cell is a suitable cell, the suitable relay being in an RRC connected state.

In one embodiment, the suitable L2 relay is or includes: a PCell belongs to a PLMN selected by the first node or registered by the first node or that belongs to an equivalent PLMN list, where the suitable relay is in an RRC connected state.

In one embodiment, the suitable L2 relay is or includes: a serving cell belongs to a PLMN selected by the first node or registered by the first node or that belongs to an equivalent PLMN list, where the suitable relay is in a non-RRC-connected state.

In one embodiment, the suitable L2 relay is or includes: a relay providing or capable of providing at least essential system information.

In one embodiment, the suitable L2 relay is or includes: a relay that meets the QoS requirement.

In one embodiment, the suitable L2 relay is or includes: a relay that conforms to the NAS requirement.

In one embodiment, the suitable L2 relay is or includes: a relay by which RSC indicated meets the requirement of L2 relay.

In one subembodiment, the relay service code (RSC) is used for finding a relay of 5G ProSe UE-to-Network (U2N), and for indicating the service of connection provided by the 5G ProSe U2N relay; the 5G ProSe U2N relay and 5G ProSe U2N remote UE can determine from the RSC whether to support a L2 or a L3 relay.

In one embodiment, the suitable L2 relay is or includes: a relay that establishes a PC5 connection.

In one embodiment, the suitable L2 relay is or includes: a relay that establishes a Direct link.

In one subembodiment, a PC5-S message used for establishing the direct link includes RSC.

In one subembodiment, establishing the direct link includes transmitting a DIRECT_COMMUNICATION_REQUEST message.

In one embodiment, the suitable L2 relay is or includes: a relay that receives system information from the suitable L2 relay.

In one embodiment, the suitable L2 relay is or includes: a relay that receives essential system information from the suitable L2 relay.

In one embodiment, the suitable L2 relay is or includes: a relay to which the first node indicates information about receiving paging.

In one embodiment, the suitable L2 relay is or includes: a relay to which the first node indicates information about receiving paging and by which the information is acknowledged.

In one embodiment, the suitable L2 relay is or includes: a relay with the capability of monitoring a paging message from the first node.

In one embodiment, the suitable L2 relay is or includes: a relay capable of monitoring a paging message from the first node.

In one embodiment, the suitable L2 relay is or includes: a relay capable of forwarding notification from the network.

In one embodiment, the suitable L2 relay is or includes: a relay in which no RLF occurs.

In one embodiment, the suitable L2 relay is or includes: a L2 U2N relay by which the SL-RSRP and/or SD-RSRP measured meets certain requirement.

In one subembodiment, the first node performs a measurement on a candidate relay to obtain the SL-RSRP and/or SD-RSRP.

In one subembodiment, a candidate relay performs a measurement on the first node to obtain the SL-RSRP and/or SD-RSRP.

In one embodiment, the suitable L2 relay is or includes: a L2 U2N relay by which the SL-RSRQ and/or SD-RSRQ measured meets certain requirement.

In one subembodiment, the first node performs a measurement on a candidate relay to obtain the SL-RSRQ and/or SD-RSRQ.

In one subembodiment, a candidate relay performs a measurement on the first node to obtain the SL-RSRQ and/or SD-RSRQ.

In one embodiment, the suitable L2 relay is or includes: a relay that does not receive an indication of releasing or rejecting a direct link.

In one embodiment, the suitable L2 relay is or includes: a relay to which a direct link is alive.

In one embodiment, the suitable L2 relay is or includes: a relay in a camped normally state or a relay in an RRC connected state.

In one embodiment, the phrase that an RRC connection is established includes establishing an RRC connection.

In one embodiment, the phrase that an RRC connection is established includes resuming an RRC connection.

In one embodiment, the phrase that an RRC connection is established includes re-establishing an RRC connection.

In one embodiment, when the RRC connection is established, the first node enters an RRC connected state.

In one embodiment, when the RRC connection is established, the first node is RRC connected with an access network.

In one embodiment, the phrase of registering and receiving a paging message from a PLMN or a SNPN includes initiating a registering procedure for the PLMN or the SNPN.

In one subembodiment, the registering procedure comprises transmitting a registration-related request of the NAS.

In one embodiment, the phrase of registering and receiving a paging message from a PLMN or a SNPN includes completing a registering procedure for the PLMN or the SNPN.

In one subembodiment, the registering procedure comprises transmitting a registration-related request of the NAS.

In one subembodiment, the registering procedure comprises receiving an allowed registration-related response of the NAS.

In one embodiment, the phrase of registering and receiving a paging message from a PLMN or a SNPN includes that the paging message from the PLMN or SNPN, after being transmitted to a serving cell or a base station, triggers that an air interface of the serving cell or base station transmits a paging message and/or paging-related DCI.

In one embodiment, the phrase of registering and receiving a paging message from a PLMN or a SNPN includes: receiving a paging message transmitted by a registered PLMN.

In one embodiment, the phrase of registering and receiving a paging message from a PLMN or a SNPN includes: receiving a paging message transmitted by a PLMN equivalent to a registered PLMN.

In one embodiment, the phrase of registering and receiving a paging message from a PLMN or a SNPN includes: performing a NAS registration procedure and receiving a paging message transmitted for the PLMN.

In one embodiment, the phrase of registering and receiving a paging message from a PLMN or a SNPN includes: being in a registered state, and receiving a paging message transmitted for the PLMN.

In one embodiment, the phrase of registering and receiving a paging message from a PLMN or a SNPN includes: being in a registered state for the NAS or core network, and receiving a paging message transmitted for the PLMN.

In one embodiment, the phrase of registering and receiving a paging message from a PLMN or a SNPN includes: receiving a paging message transmitted by a registered SNPN.

In one embodiment, the phrase of registering and receiving a paging message from a PLMN or a SNPN includes: receiving a paging message transmitted by a PLMN equivalent to a registered SNPN.

In one embodiment, the phrase of registering and receiving a paging message from a PLMN or a SNPN includes: performing a NAS registration procedure and receiving a paging message transmitted for the SNPN.

In one embodiment, the phrase of registering and receiving a paging message from a PLMN or a SNPN includes: being in a registered state, and receiving a paging message transmitted for the SNPN.

In one embodiment, the phrase of registering and receiving a paging message from a PLMN or a SNPN includes: being in a registered state for the NAS or core network, and receiving a paging message transmitted for the SNPN.

In one embodiment, a core network and an access network can have respective paging messages, unless otherwise emphasized that paging messages are from the core network or PLMN or SNPN, the paging messages in the present application refer to paging or paging messages of RAN side.

In one embodiment, a paging message from a PLMN or an SNPN comprises notification from the PLMN or SNPN.

In one embodiment, the first node is already registered in a first PLMN.

In one subembodiment, the first PLMN is any PLMN.

In one subembodiment, the first PLMN is a PLMN where a PCell of the first relay is located.

In one subembodiment, the first PLMN is a PLMN where a serving cell of the first relay is located.

In one subembodiment, the first PLMN is a PLMN where a cell on which the first relay is camped on is located.

In one subembodiment, the first PLMN is a PLMN where a cell on which the first node is camped on is located.

In one embodiment, the first node is already registered in an SNPN.

In one embodiment, the phrase of moving from the first state to a second state is or includes beginning to switch from the first state to the second state.

In one embodiment, the phrase of moving from the first state to a second state is or includes being switched to the second state from the first state.

In one embodiment, the phrase of moving from the first state to any cell selection state is or includes beginning to switch from the first state to the any cell selection state.

In one embodiment, the phrase of moving from the first state to any cell selection state is or includes being switched to the any cell selection state from the first state.

In one embodiment, the first state is the camped normally state.

In one subembodiment, the first condition set comprises one condition of finding a suitable cell.

In one embodiment, the first condition set comprises one condition of finding a suitable cell.

In one embodiment, the first state is a state other than being normally camped.

In one embodiment, the first state can switch to the camped normally state, and/or, the camped normally state can switch to the first state.

In one embodiment, the first quality criterion in the present application is a criterion S.

In one embodiment, the first quality criterion in the present application is:

$$Srxlev > 0 \text{ and } Squal > 0$$

Herein, the Srxlev is an RX level value of cell selection, measured in dB; the Squal is a quality value of cell selection, measured in dB.

In one subembodiment of the above embodiment:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

$Q_{rxlevmeas}$ given in the above two formulas is an RX level value of a measured cell, i.e., a Reference Signal Receiving Power (RSRP); $Q_{qualmeas}$ is a quality value of a measured cell, i.e., a Reference Signal Receiving Quality (RSRQ); other parameters provided in these formulas are either configured by the system, for instance by system information, or using their default values, e.g., 0.

In one embodiment, under the assumption of not using L2 relay, a suitable cell is a cell that satisfies the first quality criterion, namely, a suitable cell shall satisfy the first quality criterion; on the condition that a L2 relay is used, a suitable cell needn't meet the first quality criterion for the first node that serves as a L2 U2N remote node.

In one subembodiment, the phrase of not using L2 relay includes not supporting L2 U2N relay.

In one subembodiment, the phrase of not using L2 relay includes not finding a suitable L2 U2N relay.

In one subembodiment, on the condition that a L2 relay is used, a suitable cell of the first relay is considered to be a suitable cell of the first node.

In one subembodiment, the L2 relay is a L2 U2N relay.

In one subembodiment, on the condition that a L2 relay is used, a PCell of the first relay is considered to be a suitable cell of the first node.

In one subembodiment, on the condition that a L2 relay is used, a PCell of the first relay that meets the quality requirement is considered to be a suitable cell of the first node.

In one subembodiment, on the condition that a L2 relay is used, a serving cell of the first relay is considered to be a suitable cell of the first node.

In one subembodiment, on the condition that a L2 relay is used, a serving cell of the first relay that meets the quality requirement is considered to be a suitable cell of the first node.

In one subembodiment, on the condition that a L2 relay is used, the first node determines a suitable cell according to a second criterion, the second criterion comprising: the first relay being a suitable L2 relay, and the first cell is a suitable cell of the first relay.

In one subembodiment, on the condition that a L2 relay is used, the first node determines a suitable cell according to a second criterion, the second criterion comprising: the first cell not being barred.

In one subembodiment, on the condition that a L2 relay is used, the first node determines a suitable cell according to a second criterion, the second criterion comprising: the first cell belonging to a PLMN selected or registered by the first node or having equivalent properties.

In one subembodiment, on the condition that a L2 relay is used, the first node determines a suitable cell according to a second criterion, the second criterion comprising: a criterion other than the first quality criterion.

In one embodiment, under the assumption of not using L2 relay, a suitable cell is a cell that satisfies the first quality criterion, namely, a suitable cell shall satisfy the first quality criterion; on the condition that a L2 relay is used, a suitable cell needs to meet the first quality criterion as well for the first node that serves as a L2 U2N remote node.

In one embodiment, in the second state, the RRC connection is established via the first relay, or, the RRC connection is directly established without being relayed.

In one embodiment, the second state is a connected mode.

In one embodiment, the second state is an indirectly connected mode.

In one embodiment, the first node, as a response to satisfying at least one condition in a first cell re-selection condition set, performs cell re-selection assessment;

herein, the first cell re-selection condition set comprises: when information on a BCCH used for cell re-selection assessment changes, when the first relay is failed, and when channel quality of a first radio link is lower than a first threshold, as according to internal triggering within the first node; herein, the first radio link is a radio link between the first node and the first relay.

Embodiment 2

Figure 2:
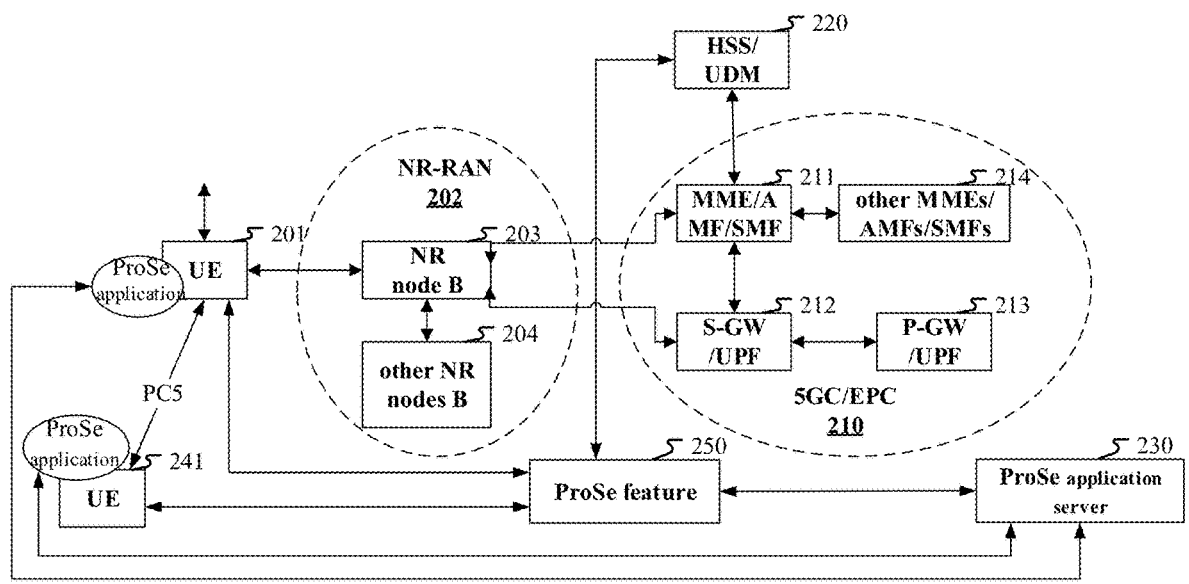
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE241, an NG-RAN 202, a 5G-Core Network/Evolved Packet Core (5GC/EPC) 210, a Home Subscriber Server/Unified Data Management (HSS/UDM) 220, a ProSe feature 250 and ProSe application server 230. The V2X communication architecture may be interconnected with other access networks. For simple description, the entities/interfaces are not shown. As shown in FIG. 2, the V2X communication architecture provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201—oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE201 and the UE241 are connected by a PC5 Reference Point.

In one embodiment, the ProSe feature 250 is connected to the UE 201 and the UE 241 respectively by PC3 Reference Points.

In one embodiment, the ProSe feature 250 is connected to the ProSe application server 230 by a PC2 Reference Point.

In one embodiment, the ProSe application server 230 is connected with the ProSe application of the UE 201 and the ProSe application of the UE 241 respectively via a PC1 Reference Point.

In one embodiment, the first node in the present application is the UE 201.

In one embodiment, the second node in the present application is the gNB203.

In one embodiment, the third node in the present application is the UE 241.

In one embodiment, a radio link between the UE 201 and the UE 241 corresponds to a sidelink (SL) in the present application.

In one embodiment, a radio link from the UE 201 to the NR Node B is an uplink.

In one embodiment, a radio link from the NR Node B to the UE 201 is a downlink.

In one embodiment, a radio link from the UE 241 to the NR Node B is an uplink.

In one embodiment, a radio link from the NR Node B to the UE 241 is a downlink.

In one embodiment, the UE 201 supports L2 relay transmission.

In one embodiment, the UE 241 supports L2 relay transmission.

In one embodiment, the UE 201 is a means of transportation including automobile.

In one embodiment, the UE 241 is a means of transportation including automobile.

In one embodiment, the gNB 203 is a MacroCellular base station.

In one embodiment, the gNB203 is a Micro Cell base station.

In one embodiment, the gNB 203 is a PicoCell base station.

In one embodiment, the gNB203 is a flight platform.

In one embodiment, the gNB203 is satellite equipment.

Embodiment 3

Figure 3:
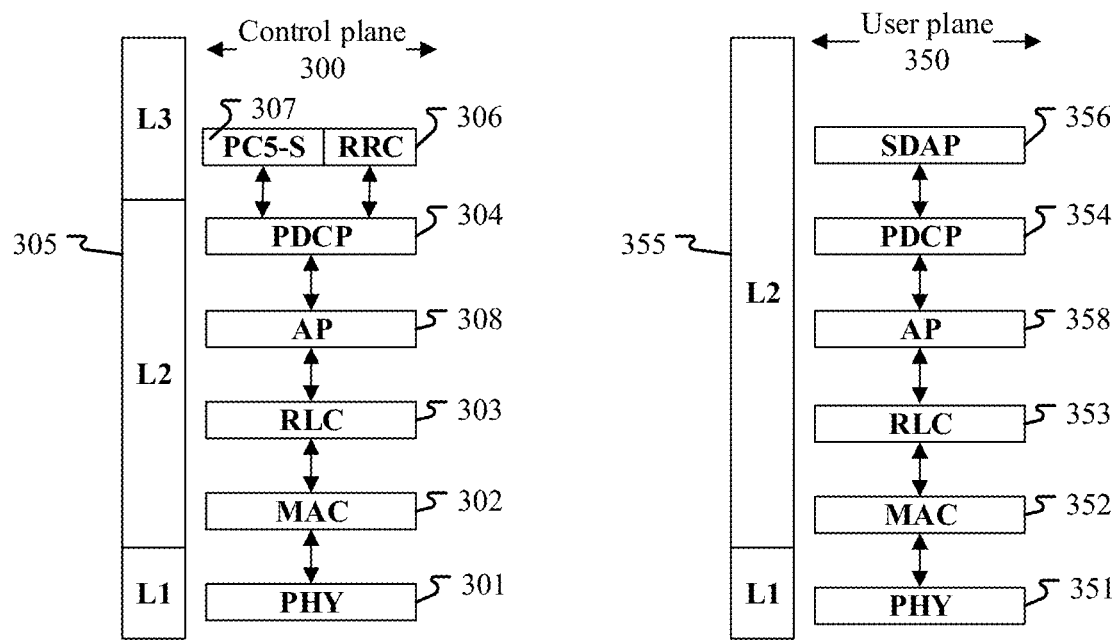
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The PC5 Signaling Protocol (PC5-S) sublayer 307 is responsible for processing the signaling protocol at the PC5 interface. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 355. Besides, the first node comprises a network layer (i.e., IP layer) terminated at a P-GW 213 of the network side and an application layer terminated at the other side of the connection (i.e., a peer UE, a server, etc.). For a UE involved with relay services, its control plane can also comprise an adaption sublayer AP308, and its user plane can also comprise an adaption sublayer AP358. The introduction of the adaption layer is beneficial for lower layers such as the MAC or the RLC layer to multiple and/or distinguish data from multiple source UEs. For UE-UE communications relating to relay services, the adaption sublayer can be excluded. Besides, the adaption sublayers AP308 and AP358 can also serve as sublayers of the PDCP304 and the PDCP354, respectively. The RRC306 can be used for processing an RRC signaling on a Uu interface and a signaling on a PC5 interface, but logically, the RRC entity processing the RRC signaling on the Uu interface and that processing the RRC signaling on the PC5 interface can be independent entities; similar ways of processing are also applicable to PDCP, RLC, MAC and PHY entities. When in non-RRC connected state, or receiving some messages or in some procedures, the AP308 or AP358 can be put aside, or such situations can be considered to be transparent for the AP308 or AP358. The adaption sublayers AP308 and AP358 are used between the PDCP and RLC for associating RLC of the PC5 interface with RLC of the Uu interface, or for multiplexing or mapping or associating of an RLC entity or channel or bearer or an RLC SDU at a scale of N:1 or 1:N.

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first signaling in the present application is generated by the PHY301, or the MAC302, or the RLC303, or the RRC306 or the PC5-S307.

In one embodiment, the first signal in the present application is generated by the PHY301, or the MAC302, or the RLC303, or the RRC306 or the PC5-S307.

In one embodiment, the first discovery message in the present application is generated by the RRC306 or the PC5-S307.

Embodiment 4

Figure 4:
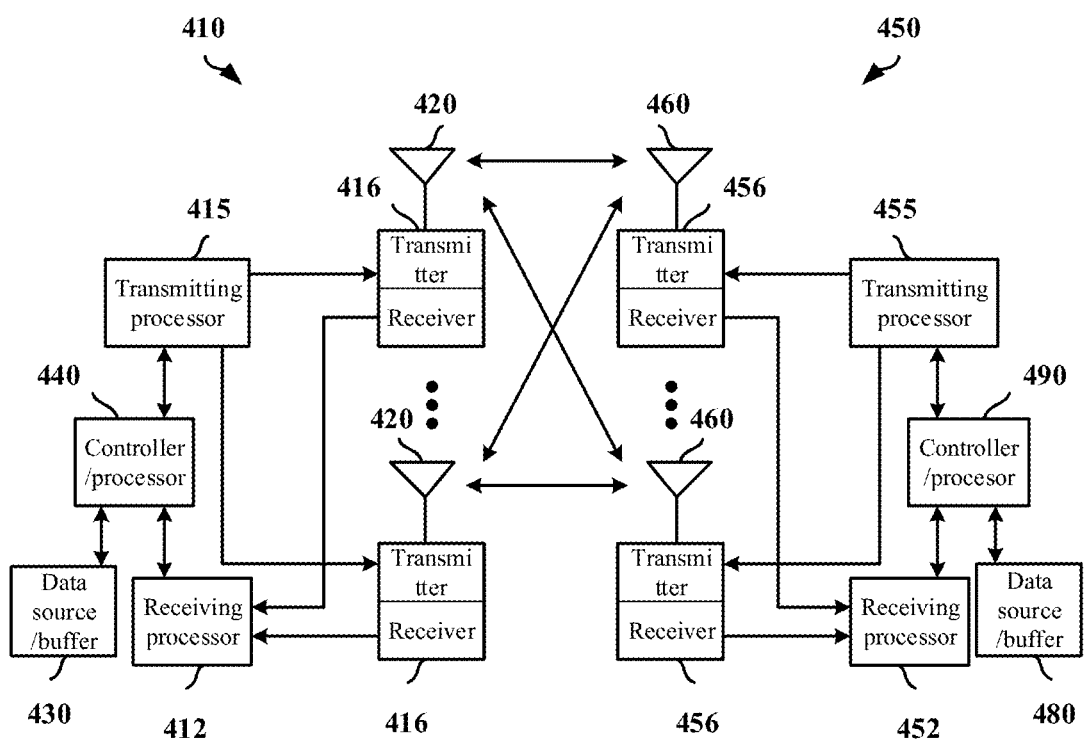
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming.

The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: enters a first state, as a response to any condition in a first condition set being satisfied; and performs a first operation set in the first state; moves from the first state to a second state, as a response to any condition in a second condition set being satisfied; and as a response to any condition in a third condition set being satisfied, moves from the first state to any cell selection state; herein, the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving paging messages from a registered PLMN or SNPN; the third condition set at least comprises one condition of performing re-selection assessment, through which neither a suitable cell nor a suitable L2 relay is found; in the second state, an RRC connection is established.

In one embodiment, the first communication node 450 comprises a memory that stores a computer readable instruction program, the computer readable instruction program generates actions when executed by at least one processor, which include: entering a first state, as a response to any condition in a first condition set being satisfied; and performing a first operation set in the first state; moving from the first state to a second state, as a response to any condition in a second condition set being satisfied; and as a response to any condition in a third condition set being satisfied, moving from the first state to any cell selection state; herein, the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving paging messages from a registered PLMN or SNPN; the third condition set at least comprises one condition of performing re-selection assessment, through which neither a suitable cell nor a suitable L2 relay is found; in the second state, an RRC connection is established.

In one embodiment, the first communication device 450 corresponds to the first node in the present application.

In one embodiment, the first communication device 450 is a UE.

In one embodiment, the first communication device 450 is a vehicle-mounted terminal.

In one embodiment, the first communication device 450 is a relay.

In one embodiment, the receiver 456 (comprising the antenna 460), the receiving processor 452 and the controller/processor 490 are used for receiving the first signaling in the present application.

In one embodiment, the receiver 456 (comprising the antenna 460), the receiving processor 452 and the controller/processor 490 are used for receiving the first discovery message in the present application.

In one embodiment, the receiver 456 (comprising the antenna 460), the receiving processor 452 and the controller/processor 490 are used for receiving the first signal in the present application.

In one embodiment, the transmitter 456 (comprising the antenna 460), the transmitting processor 455 and the controller/processor 490 are used for transmitting the first signaling in the present application.

In one embodiment, the transmitter 456 (comprising the antenna 460), the transmitting processor 455 and the controller/processor 490 are used for transmitting the first discovery message in the present application.

In one embodiment, the transmitter 456 (comprising the antenna 460), the transmitting processor 455 and the controller/processor 490 are used for transmitting the first signal in the present application.

Embodiment 5

Figure 5:
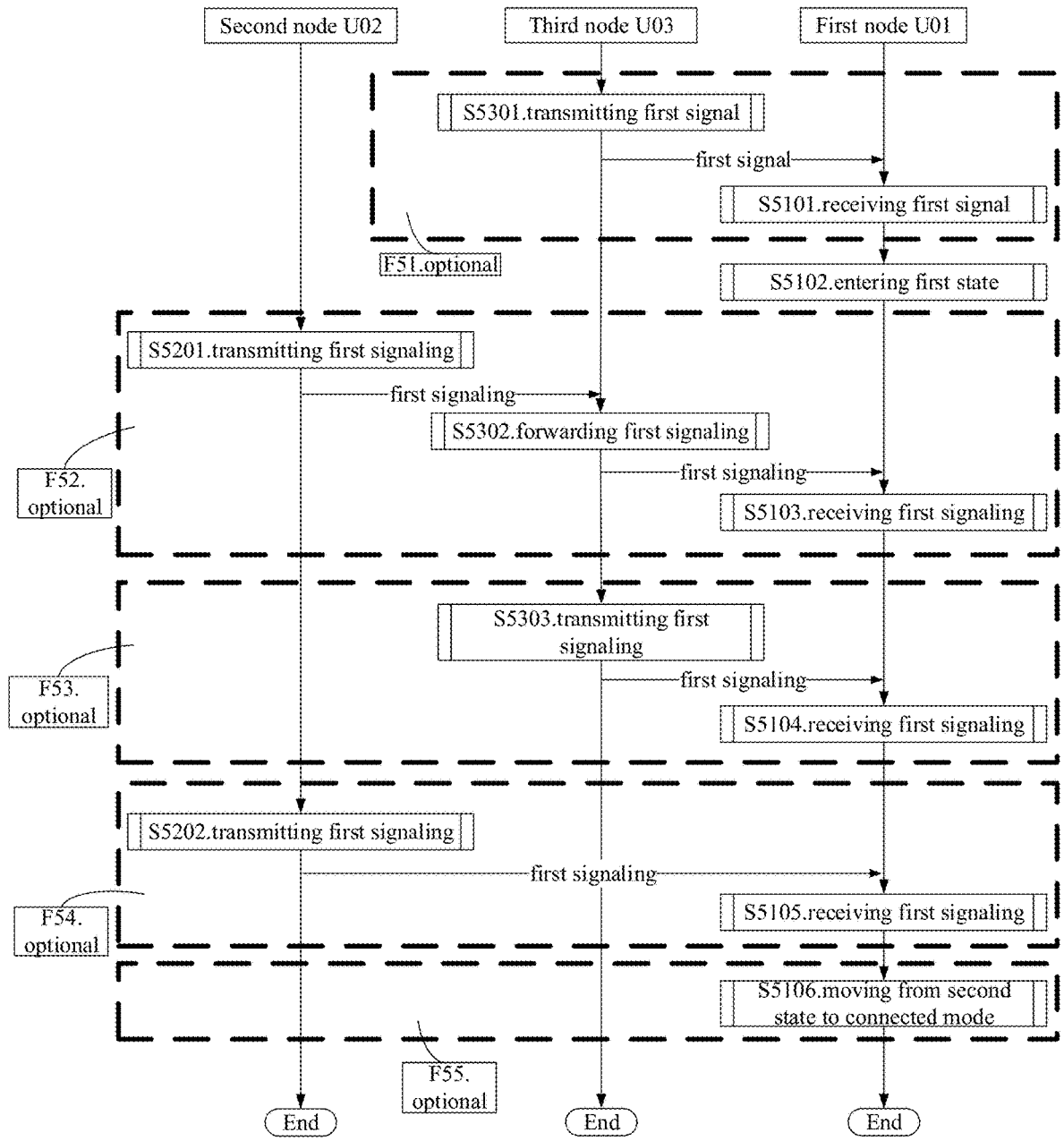
FIG. 5 illustrates a flowchart of radio signal transmission according to one embodiment of the present application.

Embodiment 5 illustrates a flowchart of radio signal transmission according to one embodiment of the present application, as shown in FIG. 5. In FIG. 5, U01 corresponds to a first node in the present application, U02 is a cell or a base station, and U03 corresponds to a first relay in the present application. It should be particularly noted that the order presented in this embodiment does not limit the order of signal transmissions or the order of implementations of the present application; herein, steps marked by the F51, F52, F53, F54 and F55 are optional.

The first node U01 receives a first signal in step S5101; enters a first state in step S5102; and receives a first signaling in step S5103; and receives a first signaling in step S5104; and receives a first signaling in step S5105; and moves from a second state to a connected mode in step S5106.

The second node U02 transmits a first signaling in step S5201; and transmits a first signaling in step S5202.

The third node U03 transmits a first signal in step S5301; and forwards a first signaling in step S5302; and transmits a first signaling in step S5303.

In Embodiment 5, the first node U01 enters a first state as a response to any condition in a first condition set being satisfied; and performs a first operation set in the first state; moves from the first state to a second state, as a response to any condition in a second condition set being satisfied; and as a response to any condition in a third condition set being satisfied, moves from the first state to any cell selection state;

herein, the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving a paging message from a registered PLMN or SNPN; the third condition set at least comprises one condition of performing re-selection assessment, through which neither a suitable cell nor a suitable L2 relay is found; in the second state, an RRC connection is established.

In Embodiment 5, three different schemes for implementing the first signaling are respectively given in F52, F53 and F54; in Embodiment 5, one or none of F52, F53 and F54 is chosen for application.

In one embodiment, the first node U01 is a U2N remote UE.

In one embodiment, the first node U01 is a L2 U2N remote UE.

In one embodiment, the first node U01 is an NR ProSe U2N remote UE.

In one embodiment, the third node U03 is a UE.

In one embodiment, the third node U03 is a U2N relay of the first node U01.

In one embodiment, the third node U03 is a L2 relay of the first node U01.

In one embodiment, the third node U03 is an NR ProSe U2N relay.

In one embodiment, the second node U02 is a serving cell of the first node U01.

In one embodiment, the second node U02 is a PCell of the first node U01.

In one embodiment, the second node U02 is a Master Cell Group (MCG) of the first node U01.

In one embodiment, the second node U02 is a base station to which a PCell of the first node U01 corresponds or belongs.

In one embodiment, the second node U02 is a camped cell of the first node U01.

In one embodiment, the second node U02 is a suitable cell of the first node U01.

In one embodiment, the second node U02 is a PCell of the third node U03, or is a base station to which a PCell of the third node U03 corresponds or belongs.

In one subembodiment, the third node U03 is in an RRC connected state.

In one embodiment, the second node U02 is a serving cell of the third node U03.

In one subembodiment, the third node U03 is in a non-RRC connected state.

In one embodiment, the second node U02 is a Master Cell Group (MCG) of the third node U03.

In one embodiment, the first node U01 and the third node U03 share a same PCell.

In one embodiment, the first node U01 and the third node U03 share a same serving cell.

In one subembodiment, the third node U03 and the first node U01 are both in non-RRC connected state.

In one embodiment, the second node U02 is a cell on which the third node U03 is camped.

In one embodiment, the second node U02 is a suitable cell of the third node U03.

In one embodiment, a camped cell of the first node U01 is or belongs to the second node U02.

In one embodiment, a camped cell of the third node U03 is or belongs to the second node U02.

In one embodiment, a cell to which the first node U01 belongs is or belongs to the second node U02.

In one embodiment, a cell to which the third node U03 belongs is or belongs to the second node U02.

In one embodiment, the first node U01 selects the third node U03 which is to be connected with the network; a cell on which the first node U01 is camped is not a cell with optimal signal quality of the first node U01.

In one subembodiment, the phrase to be connected with the network includes receiving system information and/or receiving a paging message and/or establishing an RRC connection.

In one subembodiment, the first node U01 is camped on the cell on which the third node U03 is camped.

In one embodiment, there is an RRC connection between the first node U01 and the third node U03.

In one embodiment, there is no RRC connection between the first node U01 and the third node U03.

In one embodiment, the first node U01 is in an RRC connected state.

In one embodiment, the first node U01 is in a non-RRC connected state.

In one embodiment, the first node U01 is in an RRC_IDLE state.

In one embodiment, the first node U01 is in an RRC_INACTIVE state.

In one embodiment, there is an RRC connection between the third node U03 and the second node U02.

In one embodiment, there is no RRC connection between the third node U03 and the second node U02.

In one embodiment, the third node U03 is in an RRC connected state.

In one embodiment, the third node U03 is in a non-RRC connected state.

In one embodiment, the third node U03 is in an RRC_IDLE state.

In one embodiment, the third node U03 is in an RRC_INACTIVE state.

In one embodiment, there is an RRC connection between the first node U01 and the second node U02.

In one embodiment, there is a PC5 connection between the first node U01 and the second node U02.

In one embodiment, the third node U03 applies system information of the second node U02.

In one embodiment, the first node U01 applies system information forwarded by the third node U03.

In one subembodiment, the third node U03 forwards system information transmitted by the second node U02.

In one embodiment, the first node U01 is in communication with the second node U02 via a direct path before entering the first state.

In one embodiment, the first node U01 establishes a PC5 connection or a direct link to the second node U02 or is in communication with the second node U02 using a sidelink before entering the first state.

In one subembodiment, the PC5 connection is a relay-related PC5 connection.

In one embodiment, the first node U01 is in communication with the third node U03 via a sidelink.

In one embodiment, a direct link used for L2 relay is established between the first node U01 and the third node U03.

In one embodiment, the first node U01, before the action of moving from the first state to a second state, receives a first signal on a sidelink, the first signal being used to indicate a first cell, and determines the first cell to be a camped cell of the first node U01;

herein, when the third node U03 is in an RRC connected state, the first cell is a PCell of the third node U03, when the third node U03 is in non-RRC connection, the first cell is a serving cell of the third node U03.

In one subembodiment, the first cell is the second node U02 or belongs to the second node U02.

In one subembodiment, the first signal comprises a discovery message.

In one subembodiment, the first signal comprises an NCI, the NCI indicating the first cell.

In one subembodiment, the first cell is a camped cell of the third node U03.

In one subembodiment, the first cell is a suitable cell of the third node U03.

In one subembodiment, the first cell is a cell in connection with the third node U03.

In one subembodiment, the first signal is an identity of the first cell.

In one subembodiment, the first node U01 is camped on the first cell.

In one subembodiment, the third node is either in an RRC connected state or a non-RRC connected state.

In one subembodiment, when the third node U03 is in a non-RRC connected state, the third node U03 is only connected with one serving cell.

In one subembodiment, the first cell is a suitable cell of the first node U01.

In one subembodiment, quality of the first cell determined by the first node U01 through measuring or cell selection assessment or cell search does not meet the criterion S.

In one subembodiment, quality of the first cell determined by the first node U01 through measuring or cell selection assessment or cell search does not meet the first criterion.

In one subembodiment, the first signal comprises a Mode A or Mode B discovery message.

In one embodiment, in step S5102, the first node U01 enters the first state.

In one subembodiment, the first state is a camped normally state.

In one subembodiment, the first state is not a camped normally state.

In one embodiment, the first signal is used to determine that at least one condition in the first condition set is satisfied.

In one subembodiment, the first node U01 measures the first signal to obtain an SD-RSRP, the SD-RSRP satisfying the quality requirement of L2 U2N relay selection.

In one subembodiment, there is no PC5 connection between the first node U01 and the third node U03.

In one subembodiment, there is no direct link between the first node U01 and the third node U03.

In one subembodiment, the first node U01, after receiving the first signal in step S5101 and before step S5102, establishes a PC5 connection or a direct link or a direct link for L2 U2N relay to the third node U03.

In one embodiment, in step S5302, the third node U03 forwards the first signaling via L2 relay.

In one embodiment, in step S5202, the first signaling is not forwarded by the third node U03.

In one embodiment, in F52, the first signaling being forwarded by the third node U03 is received by the first node U01.

In one subembodiment, the first signaling is an RRC signaling.

In one subembodiment, the first signaling is or comprises a paging message.

In one subembodiment, the first signaling is or comprises a Short Message.

In one subembodiment, the first signaling is or comprises system information.

In one subembodiment, the first signaling is or comprises system notification.

In one subembodiment, the first signaling is or comprises a message related to multicast broadcast services (MBS).

In one subembodiment, the first signaling is or comprises a message on an MBS Control Channel (MCCH) or an MBS Traffic Channel (MTCH).

In one embodiment, in F53, the first signaling is transmitted to the first node U01 by the third node U03.

In one subembodiment, a generator for the first signaling is the third node U03.

In one subembodiment, the first signaling is or comprises a PC5-S signaling.

In one subembodiment, the first signaling is or comprises a PC5-RRC signaling.

In one subembodiment, the first signaling is or comprises an adaption layer signaling.

In one subembodiment, the first signaling is or comprises a PC5-MAC signaling.

In one subembodiment, the first signaling is or comprises a PC5-PHY signaling.

In one subembodiment, a physical channel occupied by the first signaling is or comprises a physical sidelink control channel (PSCCH).

In one subembodiment, a physical channel occupied by the first signaling is or comprises a physical sidelink shared channel (PSSCH).

In one subembodiment, the first signaling indicates that the third node U03 experiences a Radio Link Failure (RLF).

In one subembodiment, the first signaling indicates that the third node U03 experiences an RLF on the Uu interface.

In one subembodiment, the first signaling indicates that the third node U03 experiences a cell change.

In one subembodiment, the first signaling indicates that the third node U03 experiences handover.

In one subembodiment, the first signaling indicates that L2 U2N relay service is stopped.

In one subembodiment, the first signaling indicates a release of a direct link between the first node U01 and the third node U03.

In one subembodiment, the first signaling indicates an occurrence of RLF or RL error on the PC5 interface.

In one subembodiment, the first signaling indicates being barred by a cell connected to the third node U03.

In one subembodiment, the first signaling indicates being barred by the second node U02.

In one subembodiment, the first signaling indicates that a BCCH of a cell in connection with the third node U03 indicates a change to the procedure of cell selection.

In one subembodiment, the first signaling indicates that a BCCH of a cell in connection with the third node U03 indicates a change to the procedure of relay selection.

In one subembodiment, the first signaling indicates that a BCCH of a cell in connection with the third node U03, i.e., the second node U02, indicates a change to the procedure of cell selection.

In one subembodiment, the first signaling indicates that a BCCH of a cell in connection with the third node U03, i.e., the second node U02, indicates a change to the procedure of relay selection.

In one subembodiment, the first signaling comprises a discovery message, the first signaling indicating that relay service is about to stop.

In one subembodiment, the first signaling indicates that QoS is restricted.

In one subembodiment, a radio channel quality determined by measuring a physical layer signal occupied by the first signaling does not satisfy the requirement for L2 U2N relay selection.

In one subembodiment, a radio channel quality determined by measuring a physical layer resource occupied by the first signaling does not satisfy the requirement for L2 U2N relay selection.

In one embodiment, in F54, the first signaling is directly sent to the first node U01.

In one subembodiment, the first signaling indicates that no support is to be provided for relay or L2 U2N relay.

In one subembodiment, it is determined by measuring an SSB occupied by the first signaling that a radio channel quality of the second node U02 is higher than a first threshold, when the radio channel quality of the second node U02 is higher than the first threshold, the first node U01 cannot use the L2 U2N relay.

In one subembodiment, it is determined by measuring an SS/PBCH occupied by the first signaling that a radio channel quality of the second node U02 is higher than a first threshold, when the radio channel quality of the second node U02 is higher than the first threshold, the first node U01 cannot use the L2 U2N relay.

In one subembodiment, it is determined by measuring a reference signal resource occupied by the first signaling that a radio channel quality of the second node U02 is higher than a first threshold, when the radio channel quality of the second node U02 is higher than the first threshold, the first node U01 cannot use the L2 U2N relay.

In one subembodiment, the first signaling is or comprises a MIB.

In one subembodiment, the first signaling indicates that MBS in which the first node U01 is interested begins or is about to begin.

In one subembodiment, the first signaling is or comprises a SIB1.

In one subembodiment, the first signaling is or comprises a SIB12.

In one embodiment, the first node U01 begins to switch to the connected mode in step S5106.

In one embodiment, the first node U01 moves to the connected mode in step S5106.

In one embodiment, the first node U01 moves to the connected mode successfully in step S5106.

In one embodiment, the first signaling is used for triggering a switch of the first node U01 from the second state to the connected mode.

In one embodiment, the first signaling is used for triggering a switch of the first node U01 from the first state to the connected mode.

In one embodiment, the first signaling is used for triggering a switch of the first node U01 from the first state to the second state.

In one embodiment, when the first node U01 fails to switch from the second state to the connected mode, the first node U01 enters any cell selection state.

In one embodiment, when the first node U01 fails to switch from the second state to the connected mode, the first node U01 enters the first state.

In one embodiment, when the first node U01 fails to switch from the second state to the connected mode, the first node U01 enters the second state.

In one embodiment, when the first node U01 fails to switch from the second state to the connected mode, the first node U01 performs cell selection and/or L2 U2N relay selection.

Embodiment 6

Figure 6:
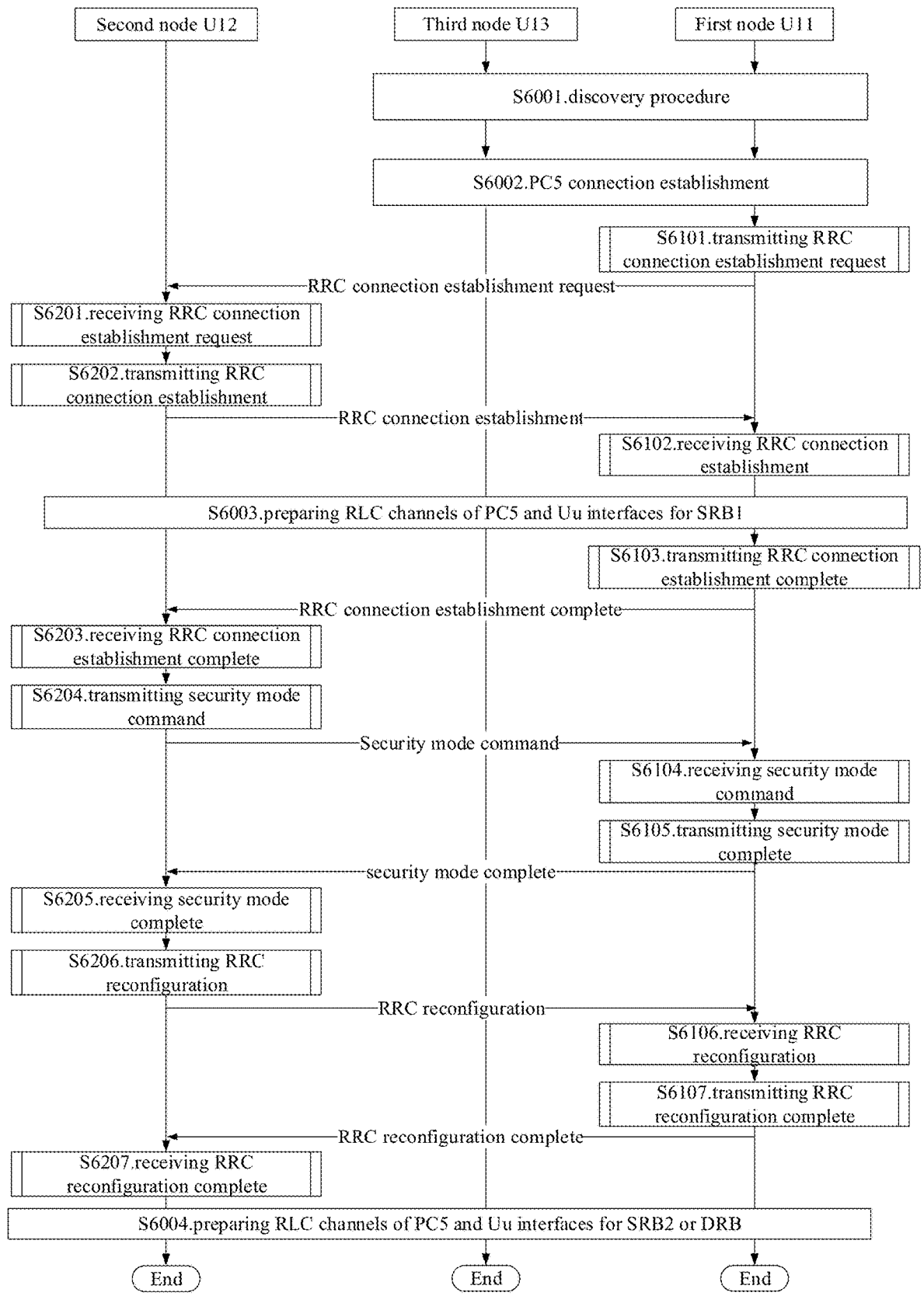
FIG. 6 illustrates a flowchart of radio signal transmission according to one embodiment of the present application.

Embodiment 6 illustrates a flowchart of signal transmission according to one embodiment of the present application, as shown in FIG. 6. In FIG. 6, U11 corresponds to a first node in the present application, U12 is a gNB, and U13 which is a third node corresponds to a first relay in the present application; it should be particularly noted that the order presented in this embodiment does not limit the order of signal transmissions or the order of implementations in the present application.

The first node U11 transmits an RRC connection establishment request in step S6101; receives an RRC connection establishment in step S6102; and transmits an RRC establishment complete in step S6103; receives a security mode command in step S6104; and transmits a security mode complete in step S6105; receives an RRC reconfiguration in step S6106; and transmits an RRC reconfiguration complete in step S6107.

The second node U12 receives an RRC connection establishment request in step S6201; transmits an RRC connection establishment in step S6202; receives an RRC connection establishment complete in step S6203; and transmits a security mode command in step S6204; and receives a security mode complete in step S6205; transmits an RRC reconfiguration in step S6206; and receives an RRC reconfiguration complete in step S6207.

Embodiment 6 illustrates a procedure of RRC connection establishment via the third node U13, in which transmissions of an RRC connection establishment request, an RRC connection establishment, an RRC connection establishment complete, a security mode command, a security mode complete, an RRC reconfiguration and an RRC reconfiguration complete are all completed through relaying of the third node U13.

In one embodiment, a step set S6001 comprises one or multiple signaling procedures; in the step set S6001, the first node U11 and the second node U12 perform a discovery procedure.

In one embodiment, a step set S6002 comprises one or multiple signaling procedures; in the step set S6002, the first node U11 and the second node U12 establish a PC5-RRC connection using an NR V2X procedure.

In one embodiment, a step set S6003 comprises one or multiple signaling procedures; in the step set S6003, the second node U12 and the first node U11 perform a procedure of relay channel establishment on a Uu interface; the first node U11 establishes an RLC channel used for relaying an SRB1 to the first node U11 on a PC5 interface according to configuration of the second node U12, and/or, the third node U13 establishes an RLC channel used for relaying an SRB1 to the first node U11 on a PC5 interface according to configuration of the second node U12.

In one embodiment, a step set S6004 comprises one or multiple signaling procedures; in the step set S6004, the first node U11 establishes an SRB2 and/or a DRB according to configuration of the second node U12; the second node U12 establishes an additional RLC channel between the second node U12 and the third node U13 for relaying data.

In one embodiment, the RRC connection establishment request is a first RRC message sent by the first node U11 for the RRC connection establishment.

In one embodiment, the RRC connection establishment request is one of an RRCSetupRequest, an RRCResumeRequest, or an RRCReestablishmentRequest.

In one embodiment, the RRC connection establishment request is one of an RRCSetup, an RRCResume, or an RRCReestablishment.

In one embodiment, the RRC connection establishment complete is one of an RRCSetupComplete, an RRCResumeComplete, or an RRCReestablishmentComplete.

In one embodiment, the RRC connection establishment request is relayed by the third node U13.

In one embodiment, the RRC connection establishment request is used for requesting establishment of an RRC connection via the third node U13 between the first node U11 and the second node U12.

In one embodiment, the RRC connection establishment request is transmitted through default or fixed PC5 RLC bearer configuration.

In one embodiment, if the third node U13 has not yet entered an RRC connected state, the third node U13 will establish an RRC connection with the second node U12 during a procedure of RRC connection establishment of the first node U1.

In one embodiment, the RRC connection establishment is in response to the RRC connection establishment request.

In one embodiment, the RRC connection establishment is transmitted through default or fixed PC5 RLC bearer configuration.

In one embodiment, the RRC connection establishment complete is forwarded to the second node U12 by the third node U13 using an SRB1 relay channel on a PC5 interface; the SRB1 relay channel is configured to the third node U13 via a Uu interface; after transmitting the RRC connection establishment complete, the first node U11 establishes an RRC connection on the Uu interface.

In one embodiment, the security mode command is used for establishing security between the first node U11 and the second node U12.

In one embodiment, the security mode complete is used for feedback of the security mode command.

In one embodiment, the security mode command is securitymodecommand.

In one embodiment, the security mode complete is securitymodecomplete.

In one embodiment, the RRC reconfiguration is RRCReconfiguration.

In one embodiment, the RRC reconfiguration complete is RRCReconfigurationComplete.

In one embodiment, the RRC reconfiguration is used for configuring an SRB2 between the first node U11 and the second node U12.

In one subembodiment, the SRB2 between the first node U11 and the second node U12 is associated with an RLC channel or RLC entity of a PC5 interface between the first node U11 and the third node U13.

In one subembodiment, the SRB2 between the first node U11 and the second node U12 is associated with an RLC channel or RLC entity of a PC5 interface between the first node U11 and the third node U13.

In one embodiment, the RRC reconfiguration is used for configuring a DRB between the first node U11 and the second node U12.

In one subembodiment, the DRB between the first node U11 and the second node U12 is associated with an RLC channel or RLC entity of a PC5 interface between the first node U11 and the third node U13.

In one subembodiment, the DRB between the first node U11 and the second node U12 is associated with an RLC channel or RLC entity of a PC5 interface between the first node U11 and the third node U13.

In one embodiment, the RRC reconfiguration complete is used for feedback of the RRC reconfiguration.

Embodiment 7

Figure 7:
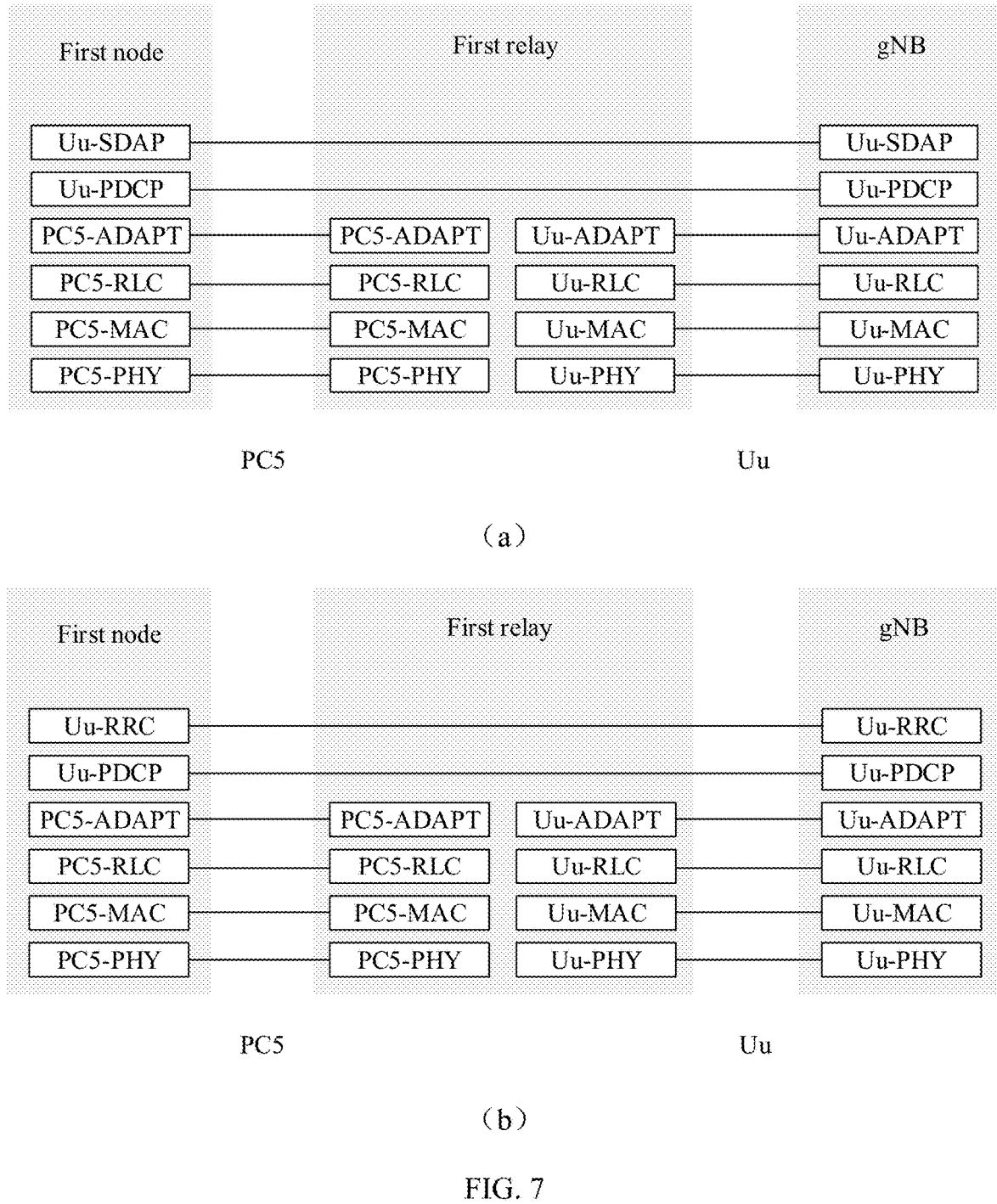
FIG. 7 illustrates a schematic diagram of a protocol stack of relay communications according to one embodiment of the present application.

Embodiment 7 illustrates a schematic diagram of a protocol stack of relay communications according to one embodiment of the present application, as shown in FIG. 7.

The protocol stack shown in FIG. 7 is applicable to L2 U2N relay communications, with Embodiment 3 as the foundation of Embodiment 7.

(a) in FIG. 7 corresponds to a user plane protocol stack in L2 U2N relay communications; (b) in FIG. 7 corresponds to a control plane protocol stack in L2 U2N relay communications.

In Embodiment 7, a PC5 interface is an interface between the first node and the first relay, where protocol entities related to the PC5 interface {PC5-ADAPT, PC5-RLC, PC5-MAC, PC5-PHY} terminate at the first node and the first relay; a Uu interface is an interface between a UE and a gNB, where protocol entities of the Uu interface respectively terminate at the UE and the gNB.

In one embodiment, the first node and the first relay are UEs.

In one embodiment, protocol entities of a Uu interface {Uu-ADAPT, Uu-RLC, Uu-MAC, Uu-PHY} terminate at the first relay and the gNB.

In one embodiment, as shown in (a), protocol entities of a Uu interface {Uu-SDAP, Uu-PDCP} terminate at the first node and the gNB; an SDAP PDU and a PDCP PDU of the first node are forwarded by the first relay, but the first relay does not modify the SDAP PDU and the PDCP PDU, which means that the SDAP PDU and the PDCP PDU transmitted to the gNB by the first node are transparent to the first relay.

In one embodiment, as shown in (b), protocol entities of a Uu interface {Uu-RRC, Uu-PDCP} terminate at the first node and the gNB; an RRC PDU and a PDCP PDU of the first node are forwarded by the first relay, but the first relay does not modify the RRC PDU and the PDCP PDU, which means that the RRC PDU and the PDCP PDU transmitted to the gNB by the first node are transparent to the first relay.

In one embodiment, as shown in (a), PC5-ADAPT corresponds to AP358 in FIG. 3, PC5-RLC corresponds to RLC353 in FIG. 3, PC5-MAC corresponds to MAC352 in FIG. 3, and PC5-PHY corresponds to PHY351 in FIG. 3.

In one embodiment, as shown in (a), Uu-SDAP corresponds to SDAP356 in FIG. 3, and Uu-PDCP corresponds to PDCP354 in FIG. 3.

In one embodiment, as shown in (b), PC5-ADAPT corresponds to AP308 in FIG. 3, PC5-RLC corresponds to RLC303 in FIG. 3, PC5-MAC corresponds to MAC302 in FIG. 3, and PC5-PHY corresponds to PHY301 in FIG. 3.

In one embodiment, as shown in (b), Uu-RRC corresponds to RRC306 in FIG. 3, and Uu-PDCP corresponds to PDCP304 in FIG. 3.

In one embodiment, the phrase that an RRC connection is established means to establish an RRC connection between the first node and the gNB.

In one embodiment, the phrase that an RRC connection is established means that a Uu-RRC entity between the first node and gNB establishes an RRC connection through a set of signaling procedures.

In one embodiment, the phrase that the RRC connection is established via the first relay means that a Uu-RRC entity between the first node and the gNB establishes an RRC connection through a set of signaling procedures, the set of signaling procedures requesting to be forwarded by the first relay.

In one subembodiment, the set of signaling procedures include one of RRC connection establishment request messages {RRCSetupRequest, RRCResumeRequest, RRCReestablishmentRequest} transmitted by the first node; the set of signaling procedures include one of RRC connection establishment messages {RRCSetup, RRCResume, RRCReestablishment} transmitted by the gNB that respectively correspond to the RRC connection establishment request messages; the set of signaling procedures include one of RRC connection establishment complete messages {RRCSetupComplete, RRCResumeComplete, RRCReestablishmentComplete} transmitted by the first node that corresponds to the RRC connection establishment.

In one subembodiment, the first node enters the second state after completing the set of signaling procedures.

In one subembodiment, the first node initiates the set of signaling procedures after entering the second state.

In one embodiment, the gNB in FIG. 7 is the second node in the present application.

In one embodiment, a cell of the gNB in FIG. 7 is a serving cell of the first relay, the first relay being in a non-RRC connected state.

In one embodiment, a cell of the gNB in FIG. 7 is a PCell of the first relay, the first relay being in an RRC connected state.

In one embodiment, a cell of the gNB in FIG. 7 is a camped cell of the first relay.

In one embodiment, a cell of the gNB in FIG. 7 is a suitable cell of the first relay.

In one embodiment, a cell of the gNB in FIG. 7 is a cell selected by the first relay.

In one embodiment, a cell of the gNB in FIG. 7 is a camped cell of the first node.

In one embodiment, a cell of the gNB in FIG. 7 is a suitable cell of the first node.

In one embodiment, a cell of the gNB in FIG. 7 is a cell selected by the first node.

In one embodiment, when the first node is in the first state, via the first relay, the first node can receive or only receives system information and paging message by the gNB.

In one embodiment, a procedure in which the gNB transmits paging or paging message for the first node comprises: transmitting a first DCI via a Uu-PHY, the first DCI including a Short Message and a P-RNTI being used for scrambling the first DCI, and transmitting a first paging message via a Uu-RRC, the first paging message comprising an identity of the first node; the first relay forwards at least partial bits in the first paging message and information related to the first node to the first node.

In one subembodiment, the first relay forwards the Short Message.

In one subembodiment, the first relay does not forward the Short Message.

In one subembodiment, the first relay forwards the first paging message through a message on a PC5 interface.

In one subembodiment, the first relay forwards the first paging message through a PC5-RRC message or a PC5-S message on a PC5 interface.

In one subembodiment, the identity of the first node includes a full I-RNTI.

In one subembodiment, the identity of the first node includes an ng-5G-S-TMSI.

In one subembodiment, the P-RNTI used for scrambling the first DCI is a P-RNTI of the first node.

In one subembodiment, the P-RNTI used for scrambling the first DCI is a P-RNTI of the first relay.

In one embodiment, a PC5-ADAPT is only used for a specific RB or message or specific data.

In one subembodiment, when the first relay forwards system information, the PC5-ADAPT layer is not used.

In one embodiment, the phrase that the RRC connection is directly established without being relayed means that any signaling procedure involved during the process of establishing the RRC connection does not require forwarding of the first relay, but instead, is directly transmitted to the gNB by the first node, in this case, the first node needs to establish a Uu-RLC, Uu-MAC and a Uu-PHY rather than a Uu-ADAPT.

In one embodiment, an RRC connection between the first relay and the gNB is directly established.

Embodiment 8

Figure 8:
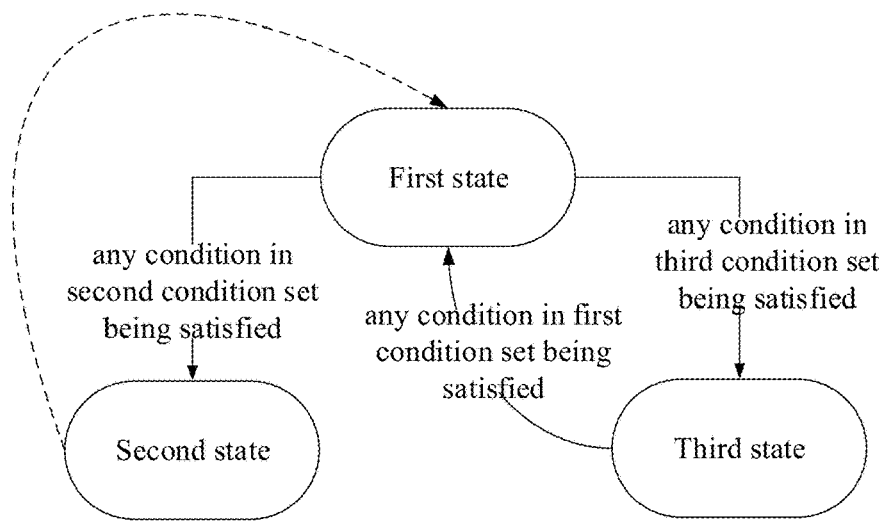
FIG. 8 illustrates a schematic diagram of state transition according to one embodiment of the present application.

Embodiment 8 illustrates a schematic diagram of state transition according to one embodiment of the present application, as shown in FIG. 8.

In FIG. 8, the dotted line indicates that the transition of state is optional, or the transition of state will have to go through another intermediate state, like cell selection and/or L2 U2N relay selection.

In FIG. 8, when any condition in the first condition set is satisfied, and the first node is in any state other than the first state, the first node enters the first state.

In one subembodiment, the any state other than the first state is or includes a camped normally state, while the first state is not the camped normally state.

In one subembodiment, the any state other than the first state is or includes any cell selection state.

In one subembodiment, the any state other than the first state is or includes a camped-on any cell state.

In one subembodiment, the any state other than the first state is or includes an initial cell selection state.

In one subembodiment, the any state other than the first state is or includes a stored information cell selection state.

In one subembodiment, the any state other than the first state is or includes a cell selection state that transits from the connected mode.

In one subembodiment, the any state other than the first state is or includes a cell re-selection assessment procedure.

In one subembodiment, the any state other than the first state is or includes a third state shown in FIG. 8.

In one subembodiment, the first state is a camped normally state.

In one subembodiment, the first condition set comprises finding a suitable cell.

In FIG. 8, the first node is in the first state, when any condition in the second condition set is satisfied, the first node moves from the first state to the second state.

In one subembodiment, the second state is a connected mode.

In one subembodiment, the second state is not a connected mode.

In one subembodiment, the second condition set comprises leaving or having to leave an idle or inactive mode.

In one subembodiment, the second condition set comprises having to enter a connected mode.

In one subembodiment, the second condition set comprises receiving a NAS layer indication and having to enter a connected mode.

In one subembodiment, the second condition set comprises receiving paging and/or a paging message, and having to or being triggered to enter a connected mode.

In one subembodiment, the second condition set comprises having to establish an RRC connection via a L2 U2N relay.

In one subembodiment, the second condition set comprises receiving a system notification.

In one subembodiment, the second condition set comprises receiving a Short Message.

In one subembodiment, the second condition set comprises receiving system information, having to receive or being interested in receiving MBS.

In one subembodiment, the second condition set comprises having to perform RNA update.

In one subembodiment, the second condition set comprises a first timer being expired.

In one subembodiment, the second condition set comprises having to register a PLMN.

In one subembodiment, the second condition set comprises having to update a tracking area.

In one subembodiment, the second condition set comprises having to register an SNPN.

In one subembodiment, the second condition set comprises having to initiate services and/or PDU sessions.

In FIG. 8, the first node is in the first state, when any condition in the third condition set is satisfied, the first node moves from the first state to the third state as shown in FIG. 8.

In one subembodiment, the third state in FIG. 8 is any cell selection state.

In one subembodiment, the third condition set at least comprises one condition of performing re-selection assessment, through which neither a suitable cell nor a suitable L2 relay is found.

In one subembodiment, the third condition set at least comprises one condition of performing re-selection assessment, through which not a suitable cell is found.

In one subembodiment, the third state in FIG. 8 is not any cell selection state, and the third condition set at least comprises one condition of performing re-selection assessment, through which no suitable L2 relay is found, where the re-selection assessment is L2 U2N relay selection and/or re-selection assessment.

In one subembodiment, the third state in FIG. 8 is any cell selection state, and the third condition set at least comprises one condition of performing re-selection assessment, through which neither a suitable cell nor a suitable L2 relay is found, where the re-selection assessment includes cell re-selection assessment and/or cell selection assessment; the re-selection assessment includes L2 U2N relay selection and/or re-selection assessment.

In one subembodiment, the third state in FIG. 8 is any cell selection state, and the third condition set at least comprises one condition of performing re-selection assessment, through which no suitable cell is found, where the re-selection assessment is cell re-selection assessment and/or cell selection assessment.

In one embodiment, the first state is a camped normally state.

In one embodiment, the second state is a connected mode.

In one embodiment, a third state in FIG. 8 is any cell selection state.

In one embodiment, a third state in FIG. 8 is any relay selection state.

In one embodiment, a third state in FIG. 8 is any cell and relay selection state.

In one embodiment, a third state in FIG. 8 is any cell or relay selection state.

In one embodiment, a third state in FIG. 8 is one of {any relay selection state, any L2 U2N relay selection state, out-of-coverage state, any cell and relay selection state, any cell and L2 U2N relay selection state, any selection state, any access point selection state}.

In one embodiment, the first state is a camped normally state, while the second state is a connected mode.

In one embodiment, the first state is a camped normally state, while the third state is any cell selection state.

In one embodiment, the second state is a connected mode, while the third state is any cell selection state.

In one embodiment, the first state is a camped normally state, while the second state is a connected mode, and the third state is any cell selection state.

In one embodiment, when the first node transits from the second state, for instance, when an RRC connection is released, or a Radio Link Failure (RLF) occurs, or an indication of the first relay is received, or when the first node itself cuts off RRC connection, the first node performs cell selection and finds a suitable cell, and then it enters the first state.

In one embodiment, when the first node transits from the second state, for instance, when an RRC connection is released, or a Radio Link Failure (RLF) occurs, or an indication of the first relay is received, or when the first node itself cuts off RRC connection, the first node performs L2 U2N relay selection and finds a suitable L2 U2N relay, and then it enters the first state.

In one embodiment, when the first node transits from the second state, for instance, when an RRC connection is released, or a Radio Link Failure (RLF) occurs, or an indication of the first relay is received, or when the first node itself cuts off RRC connection, the first node performs cell selection and L2 U2N relay selection and finds a suitable cell and/or a suitable L2 U2N relay, and then it enters the first state.

In one embodiment, the first node, before the action of entering the first state, performs cell re-selection assessment and finds no cell that satisfies a first quality criterion; herein, the first state is a camped normally state; under the assumption that L2 relay is not used: a suitable cell is a cell that satisfies the first quality criterion and the condition for entering the camped normally state includes a suitable cell being found, and the first node entering the any cell selection state.

In one subembodiment, the first quality criterion is criterion S.

In one subembodiment, the action of performing cell selection/reselection assessment is or includes cell selection.

In one subembodiment, the action of performing cell selection/reselection assessment is or includes cell re-selection.

In one subembodiment, when the first node uses a first relay, its suitable cell does not need to satisfy the first quality criterion; the first relay is a L2 relay.

In one subembodiment, the first state is a camped normally state.

In one subembodiment, when the first node uses a first relay, its suitable cell has to satisfy the first quality criterion; the first state is a camped normally state; the first condition set does not comprise a condition of a suitable cell being found; the first relay is a L2 relay.

In one subembodiment, under the assumption that L2 relay is not used, the first node will enter the any cell selection state.

In one embodiment, the first node, before the action of moving from the first state to a second state, receives a first signal on a sidelink, the first signal being used to indicate a first cell, and determines the first cell to be a camped cell of the first node; herein, when the first relay is in an RRC connected state, the first cell is a PCell of the first relay; when the first relay is not in an RRC connected state, the first cell is a serving cell of the first relay.

In one subembodiment, the first cell is determined to be a suitable cell, quality of the first cell does not satisfy the first quality criterion, the first quality criterion being the criterion S.

In one subembodiment, the first cell is considered to be a suitable cell of the first node.

In one subembodiment, the first cell is not considered to be a suitable cell of the first node.

In one subembodiment, the first state is a camped normally state.

In one subembodiment, the first signal comprises a discovery message.

In one subembodiment, the first cell is considered to be a suitable relay cell of the first node.

In one subembodiment, the first cell is considered to be a suitable L2 U2N relay cell of the first node.

In one embodiment, the first node determines a first cell to be a suitable cell according to a second criterion; the first cell does not satisfy a first quality criterion; herein, under the assumption that L2 relay is not used, a suitable cell is a cell that satisfies the first quality criterion.

In one subembodiment, the second criterion does not include the first quality criterion.

In one subembodiment, the second criterion can be satisfied without satisfying the first quality criterion.

In one subembodiment, when performing cell selection, satisfying the second criterion shall be based on the satisfaction of the first quality criterion; when performing L2 U2N relay selection, the satisfaction of the first quality criterion is not a necessary condition for satisfying the second criterion.

In one subembodiment, the second criterion comprises: the first relay being a suitable L2 relay.

In one subembodiment, the second criterion comprises: the first cell being a suitable cell of the first relay.

In one subembodiment, the second criterion comprises: the first cell not being barred.

In one subembodiment, the second criterion comprises: the first cell belonging to a PLMN selected or registered by the first node or having equivalent properties.

In one subembodiment, a condition for entering the first state includes finding a suitable cell.

In one subembodiment, the first quality criterion is criterion S.

In one subembodiment, the first condition set does not comprise the first quality criterion.

In one subembodiment, the first cell is considered to be a suitable relay cell of the first node.

In one subembodiment, the first cell is considered to be a suitable L2 U2N relay cell of the first node.

In one subembodiment, the suitable cell includes a suitable relay cell.

In one subembodiment, the suitable cell does not include a suitable relay cell.

In one embodiment, the first node, before the action of entering the first state, performs cell re-selection assessment and finds no cell that satisfies a first quality criterion; herein, a suitable cell is a cell that satisfies the first quality criterion.

In one subembodiment, the first quality criterion is criterion S.

In one subembodiment, the first state is a camped normally state.

In one subembodiment, the first node does not find any suitable cell before entering the first state.

Embodiment 9

Figure 9:
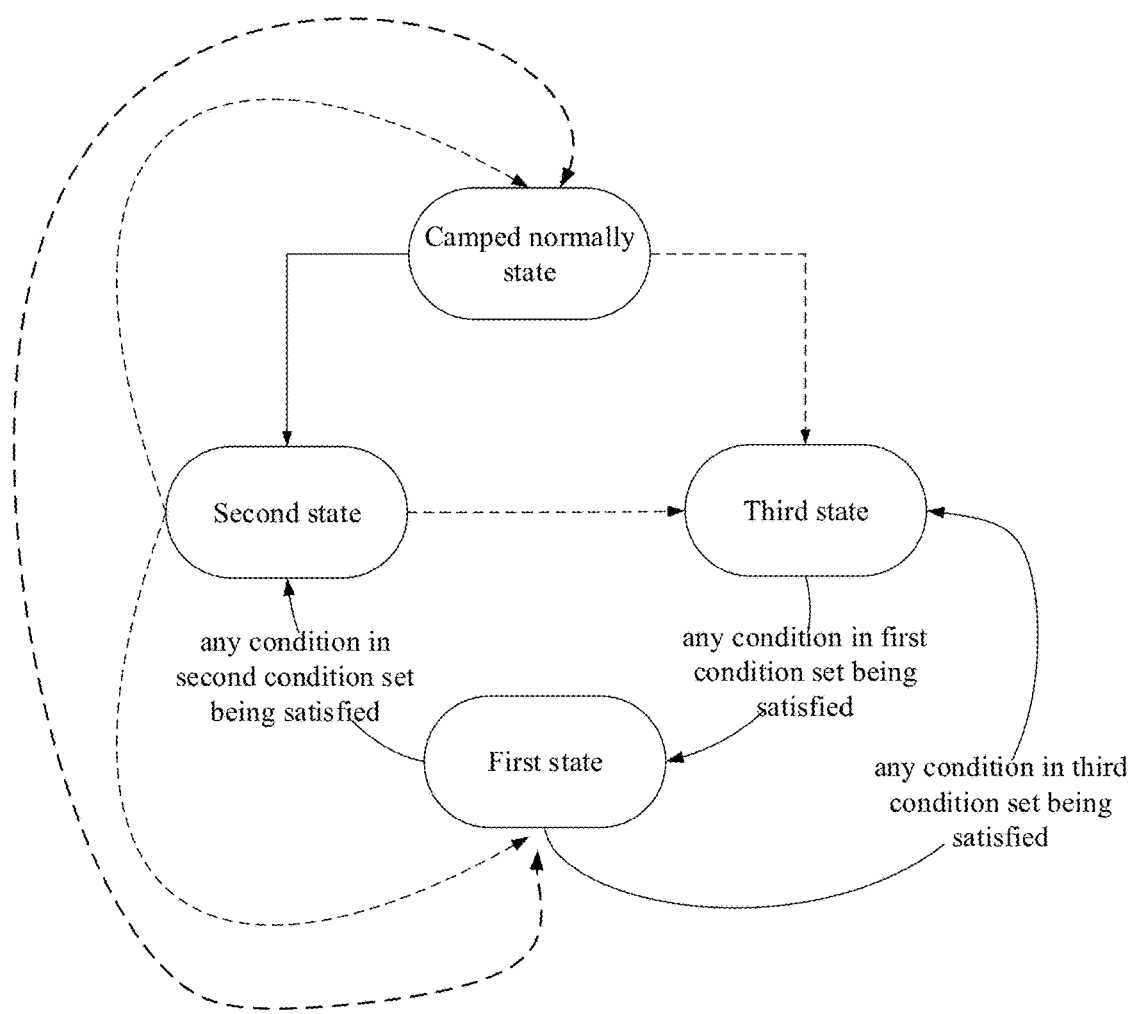
FIG. 9 illustrates a schematic diagram of state transition according to one embodiment of the present application.

Embodiment 9 illustrates a schematic diagram of state transition according to one embodiment of the present application, as shown in FIG. 9.

In FIG. 9, the dotted line indicates that the transition of state is optional, or the transition of state will have to go through another intermediate state, like cell selection and/or L2 U2N relay selection.

Embodiment 9 takes Embodiment 8 as the foundation, so that embodiments given in Embodiment 8 can be combined with embodiments below in Embodiment 9.

In Embodiment 9, the first state is not a state of being camped normally.

In one embodiment, the second state in FIG. 9 is a Connected mode.

In one embodiment, the second state in FIG. 9 is not a Connected mode.

In one embodiment, the second state in FIG. 9 is a relay connected mode.

In one embodiment, the second state in FIG. 9 is a mode of being connected via relay.

In one embodiment, the second state in FIG. 9 is a relayed mode.

In one embodiment, the second condition set comprises leaving or having to leave an idle or inactive mode.

In one embodiment, the second condition set comprises deciding to enter a connected mode.

In one embodiment, the second condition set comprises having to enter a connected mode.

In one embodiment, the second condition set comprises receiving a NAS layer indication and having to enter a connected mode.

In one embodiment, the second condition set comprises receiving paging and/or a paging message, and having to or being triggered to enter a connected mode.

In one embodiment, the second condition set comprises having to establish an RRC connection via a L2 U2N relay.

In one embodiment, the second condition set comprises receiving a system notification.

In one embodiment, the second condition set comprises receiving a Short Message.

In one embodiment, the second condition set comprises receiving system information, having to receive or being interested in receiving MBS.

In one embodiment, the second condition set comprises having to perform RNA update.

In one embodiment, the second condition set comprises a first timer being expired.

In one embodiment, the second condition set comprises having to register a PLMN.

In one embodiment, the second condition set comprises having to update a tracking area.

In one embodiment, the second condition set comprises having to register an SNPN.

In one embodiment, the second condition set comprises having to initiate services and/or PDU sessions.

In one embodiment, a third state in FIG. 9 is any cell selection state.

In one embodiment, a third state in FIG. 9 is one of {any relay selection state, any L2 U2N relay selection state, out-of-coverage state, any cell and relay selection state, any cell and L2 U2N relay selection state, any selection state, any access point selection state}.

In one embodiment, after leaving from the second state, the first node performs cell selection or initial cell selection, if a suitable cell is found it enters the camped normally state, if no suitable cell is found it enters the third state directly or via another intermediate state, the third state being any cell selection state.

In one embodiment, after leaving from the second state, the first node performs L2 U2N relay selection, if a suitable L2 U2N relay is found it enters the first state, if no suitable L2 U2N relay is found it enters the third state.

In one embodiment, after leaving from the second state, the first node performs L2 U2N relay selection, if a suitable L2 U2N relay is found it enters the first state, if no suitable L2 U2N relay is found it enters the third state, the third state being one of {any relay selection state, any cell selection state, any cell and relay selection state, any relay or cell selection state}.

In one embodiment, after leaving from the second state, the first node performs cell selection and L2 U2N relay selection, if neither a suitable L2 U2N relay nor a suitable cell is found it enters the third state, the third state being one of {any relay selection state, any cell selection state, any cell and relay selection state, any relay or cell selection state}.

In one embodiment, after leaving from the second state, the first node performs cell selection and L2 U2N relay selection, if both a suitable L2 U2N relay and a suitable cell are found it enters the camped normally state or the first state according to internal algorithm.

In one embodiment, when the first node in the camped normally state finds that there is no suitable cell or that the cell it camps on is no longer suitable, it moves to the third state, the third state being one of {any relay selection state, any cell selection state, any cell and relay selection state, any relay or cell selection state}.

In one embodiment, when the first node in the camped normally state finds that there is no suitable cell or that the cell it camps on is no longer suitable, and finds no suitable L2 U2N relay, it moves to the third state, the third state being one of {any relay selection state, any cell selection state, any cell and relay selection state, any relay or cell selection state}.

In one embodiment, the first node is in a non-RRC connected state.

In one embodiment, when the first node is in the camped normally state, and quality of the cell it is camped on is lower than a first quality requirement, the first node performs relay selection and/or cell selection, as a result of the relay selection, the first node finds a suitable L2 U2N relay, and the first node moves from the camped normally state directly or via another intermediate state to the first state.

In one subembodiment, the quality of the cell camped on by the first node being lower than the first quality requirement triggers cell selection and/or relay selection performed by the first node.

In one subembodiment, the first quality requirement is used to determine whether a cell is suitable, where a suitable cell shall meet the first quality requirement.

In one subembodiment, the first quality requirement is the first quality criterion.

In one subembodiment, the first quality requirement is criterion S.

In one subembodiment, the first quality requirement is used to determine whether a L2 U2N relay is allowed to be selected, namely, only when the cell camped on does not meet the first quality requirement will the L2 U2N relay be allowed to be selected.

In one subembodiment, the first quality requirement is used to determine whether a L2 U2N relay is allowed to be selected, namely, only when none of the cells meets the first quality requirement will the L2 U2N relay be allowed to be selected.

In one subembodiment, the first quality requirement is used to determine whether a L2 U2N relay is allowed to be selected, namely, only when none of the suitable cells meets the first quality requirement will the L2 U2N relay be allowed to be selected.

In one subembodiment, the first quality requirement is used to determine whether a L2 U2N relay is allowed to be selected, namely, only when an optimal cell among all measurable cells or best cells or suitable cells does not meet the first quality requirement will the L2 U2N relay be allowed to be selected.

In one subembodiment, the L2 U2N relay mentioned in the phrase that the first node finds a suitable L2 U2N relay is the first relay.

In one embodiment, when in the first state the first node receives system information via the first relay, the first relay being a suitable L2 U2N relay, a signal quality of the first relay no longer satisfies the requirement or the first relay is no longer a suitable L2 U2N relay, the first node is triggered to perform relay selection and/or cell selection, and as a response to discovery of a suitable cell, the first node is switched from the first state to the camped normally state.

In one embodiment, when in the first state the first node finds that at least quality of a second cell satisfies the first quality requirement.

In one subembodiment, the action of finding that at least quality of a second cell satisfies the first quality requirement triggers that the first node performs cell selection.

In one subembodiment, the action of finding that at least quality of a second cell satisfies the first quality requirement triggers that the first node selects the second cell.

In one subembodiment, the action of finding that at least quality of a second cell satisfies the first quality requirement triggers that the first node stops using the first relay.

In one subembodiment, the action of finding that at least quality of a second cell satisfies the first quality requirement triggers that the first node stops using the L2 U2N relay.

In one subembodiment, the first quality requirement is used to determine whether a L2 U2N relay is allowed to be selected, namely, only when none of the cells meets the first quality requirement will the L2 U2N relay be allowed to be selected.

In one subembodiment, the first quality requirement is used to determine whether a L2 U2N relay is allowed to be selected, namely, only when none of the suitable cells meets the first quality requirement will the L2 U2N relay be allowed to be selected.

In one subembodiment, the first quality requirement is used to determine whether a L2 U2N relay is allowed to be selected, namely, only when an optimal cell among all measurable cells or best cells or suitable cells does not meet the first quality requirement will the L2 U2N relay be allowed to be selected.

In one subembodiment, the first quality requirement is used to determine whether a L2 U2N relay is allowed to be selected, namely, when there is one cell that meets the first quality requirement the L2 U2N relay is not allowed to be used.

In one subembodiment, the first quality requirement includes that signal quality of a measured cell satisfies a certain threshold.

In one subembodiment, the first quality requirement includes that an RSRP of a measured cell satisfies a certain level threshold.

In one subembodiment, the first quality requirement includes that an RSRQ of a measured cell satisfies a certain quality threshold.

In one embodiment, the first node receives the first quality requirement of an updated version, which then triggers the first node performing cell selection and/or L2 U2N relay selection.

In one subembodiment, only when the quality of a currently camped cell is lower than the first quality requirement can the first node use the L2 U2N relay.

In one subembodiment, only when the quality of each suitable cell is lower than the first quality requirement can the first node use the L2 U2N relay.

In one subembodiment, only when the quality of each cell among all suitable cells and acceptable cells is lower than the first quality requirement can the first node use the L2 U2N relay.

In one subembodiment, only when the quality of each detectable cell is lower than the first quality requirement can the first node use the L2 U2N relay.

Embodiment 10

Figure 10:
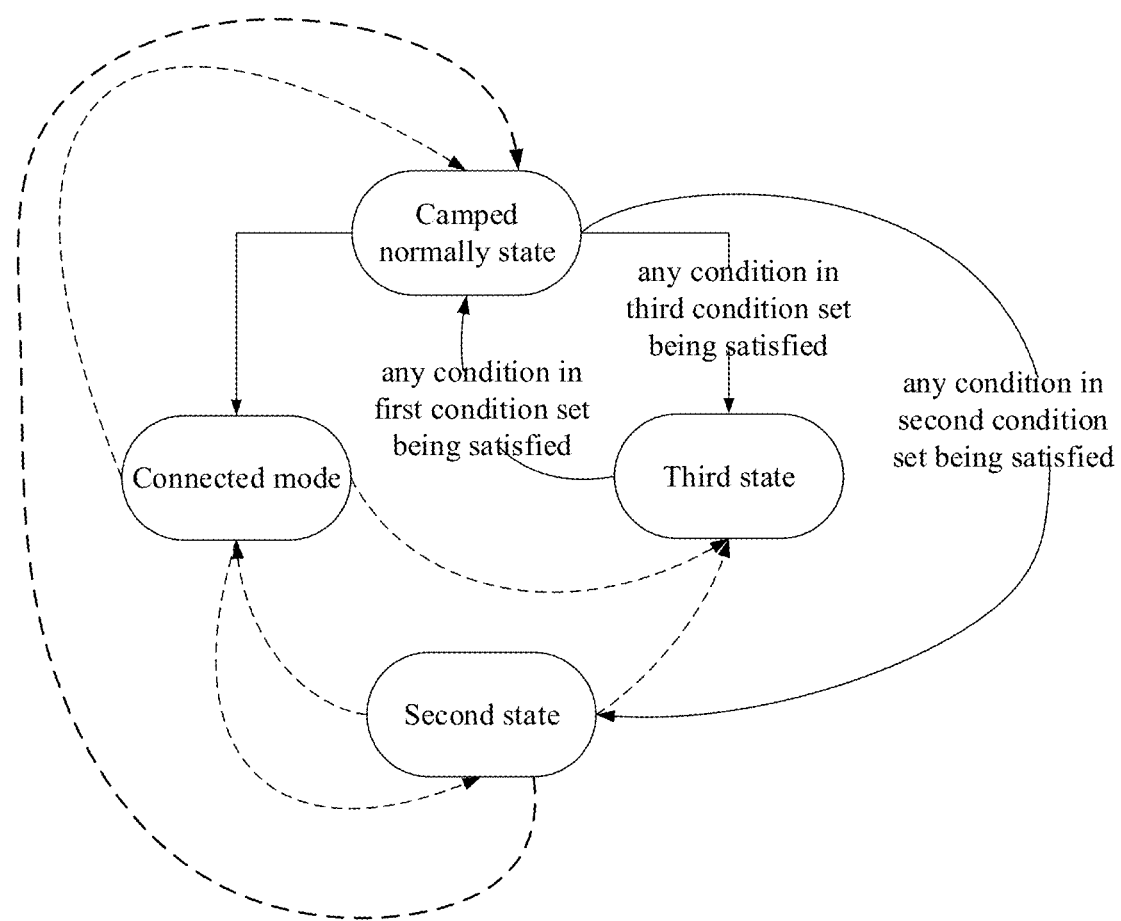
FIG. 10 illustrates a schematic diagram of state transition according to one embodiment of the present application.

Embodiment 10 illustrates a schematic diagram of state transition according to one embodiment of the present application, as shown in FIG. 10.

In FIG. 10, the dotted line indicates that the transition of state is optional, or the transition of state will have to go through another intermediate state, like cell selection and/or L2 U2N relay selection.

Embodiment 10 takes Embodiment 8 as the foundation, so that embodiments below in Embodiment 10 can be combined with embodiments given in Embodiment 8.

Embodiments given in Embodiment 10 can be combined with at least partial embodiments in Embodiment 9.

In Embodiment 10, the first state is a camped normally state, while the second state isn't a connected mode.

In one embodiment, the second state is a relay connected state.

In one embodiment, the second state is a connected state via relay.

In one embodiment, the second state is a L2 U2N relay connected state.

In one embodiment, in the second state, the first node establishes an RRC connection to the network via the first relay.

In one embodiment, in the second state, the first node establishes an RRC connection to the gNB via the first relay.

In one embodiment, the third state in FIG. 10 is one of {any relay selection state, any cell selection state, any cell and relay selection state, any relay or cell selection state}.

In one embodiment, the third condition set only comprises not finding any suitable cell.

In one embodiment, the third condition set only comprises not finding any suitable relay.

In one embodiment, the third condition set only comprises not finding any suitable L2 U2N relay.

In one embodiment, the third condition set only comprises not finding any suitable cell or any suitable relay.

In one embodiment, the third condition set only comprises not finding any suitable cell or any suitable L2 U2N relay.

In one embodiment, when the first node is in the camped normally state and does not use L2 U2N relay, then as soon as the cell on which the first node is camped is no longer suitable, the first node enters any cell selection state.

In one subembodiment, the third state is not the any cell selection state.

In one subembodiment, the third state is the any cell selection state.

In one subembodiment, when entering the camped normally state, the first node is directly camped on a suitable cell.

In one embodiment, when the first node is in the camped normally state using a first relay, the first relay being a L2 U2N relay, then as soon as the first relay is no longer a suitable L2 U2N relay, the first node enters the third state.

In one subembodiment, when entering the camped normally state, the first relay is a suitable relay.

In one subembodiment, when entering the camped normally state, the first node is connected with the network via the first relay.

In one subembodiment, when entering the camped normally state, the first node receives system information via the first relay.

In one subembodiment, when entering the camped normally state, the first node receives paging message via the first relay.

In one embodiment, when the first node transits from the connected mode, the first node performs cell selection and finds a suitable cell, it then enters the camped normally state.

In one embodiment, when the first node transits from the connected mode, the first node performs cell selection and finds no suitable cell, it then enters any cell selection state, the third state not being the any cell selection state.

In one embodiment, when the first node transits from the connected mode, the first node performs cell selection and finds no suitable cell, it then enters the third state, the third state being any cell selection state.

In one embodiment, when the first node transits from the connected mode, the first node performs relay selection and finds a suitable L2 U2N relay, it then enters the camped normally state.

In one embodiment, when the first node transits from the connected mode, the first node performs relay selection and finds no suitable L2 U2N relay, it then enters the third state.

In one embodiment, when the first node transits from the connected mode, the first node performs relay selection and cell selection, as a result of the cell selection and cell selection performed by the first node, the first node finds a suitable L2 U2N relay and/or suitable cell, it then enters the camped normally state.

In one embodiment, when the first node transits from the connected mode, the first node performs relay selection and cell selection, as a result of the cell selection and cell selection performed by the first node, the first node does not find any suitable L2 U2N relay nor any suitable cell, it then enters the third state.

In one subembodiment, the third state is any cell selection state.

In one subembodiment, the third state is any cell relay selection state.

In one embodiment, when the first node is in a connected mode and an RRC connection of the first node is released, the first node leaving from the connected mode is triggered.

In one embodiment, when the first node is in a connected mode and receives an indication from the network, the first node leaving from the connected mode is triggered.

In one embodiment, when the first node is in a connected mode and a first timer of the first node is expired, the first node leaving from the connected mode is triggered.

In one embodiment, when the first node transits from the second state, the first node performs cell selection and finds a suitable cell, it then enters the camped normally state.

In one embodiment, when the first node transits from the second state, the first node performs relay selection and finds a suitable L2 U2N relay, it then enters the camped normally state.

In one embodiment, when the first node transits from the second state, the first node performs cell selection and finds no suitable cell, it then enters any cell selection state.

In one embodiment, when the first node transits from the second state, the first node performs cell selection and finds no suitable cell, it then enters the third state.

In one embodiment, when the first node transits from the second mode, the first node performs relay selection and finds no suitable L2 U2N relay, it then enters the third state.

In one embodiment, moving from the connected mode to the second state refers to moving from a direct mode to an indirect mode.

In one embodiment, the first node receives a first indication from the network and moves from the connected mode to the second state.

In one subembodiment, the first indication from the network refers to an RRC signaling.

In one subembodiment, the first indication from the network refers to an RRCReconfiguration signaling.

In one subembodiment, the first indication from the network refers to an RRCReconfiguration signaling, and the RRCReconfiguration signaling comprises configuration of an RLC bearer or an RLC entity of a PC5 interface between the first node and the first relay; in the second state, the first node is in communication with the network via the first relay, the first relay being a L2 U2N relay.

In one subembodiment, the direct mode is a communication mode using a direct path.

In one subembodiment, the indirect mode is a communication mode using an indirect path.

In one embodiment, moving from the second state to the connected mode refers to moving from an indirect mode to a direct mode.

In one embodiment, the first node receives a second indication from the network and moves from the second state to the connected mode.

In one subembodiment, the second indication from the network refers to an RRC signaling.

In one subembodiment, the second indication from the network refers to an RRCReconfiguration signaling.

In one subembodiment, the second indication from the network comprises a ReconfigurationWithSync.

In one subembodiment, the second indication from the network comprises configuration of an RLC bearer or an RLC entity or an RLC channel of a Uu interface.

In one subembodiment, the direct mode is a communication mode using a direct path.

In one subembodiment, the indirect mode is a communication mode using an indirect path.

In one subembodiment, when the first node moves from the second state to the connected mode, the first node is disconnected from the first relay.

In one embodiment, the first node is in the second state, receiving a first signaling; and as a response to receiving the first signaling, moves from the second state to a connected mode;

herein, when in the second state, the RRC connection is established via the first relay; when in the connected mode, the RRC connection is directly established without being relayed.

In one subembodiment, the first signaling comprises system information.

In one subembodiment, the first signaling indicates that the cell is barred.

In one subembodiment, the first signaling indicates that L2 U2N relay is barred or unsupported.

In one subembodiment, the first signaling indicates the first quality requirement given in Embodiment 9, according to the first quality requirement, the first node shall switch to a connected mode or cannot use the L2 U2N relay, or the L2 U2N relay is no longer suitable.

In one subembodiment, the first signaling is the second indication.

Embodiment 11

Figure 11:
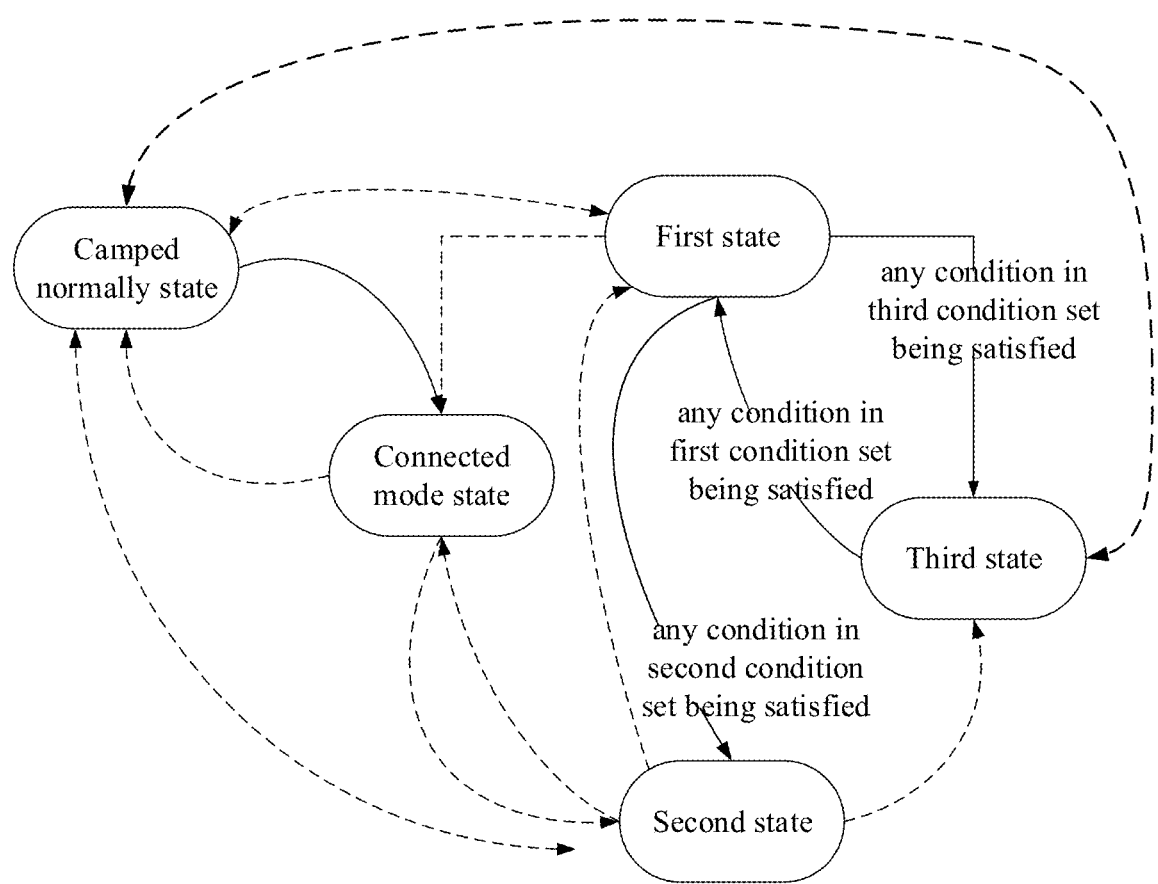
FIG. 11 illustrates a schematic diagram of state transition according to one embodiment of the present application.

Embodiment 11 illustrates a schematic diagram of state transition according to one embodiment of the present application, as shown in FIG. 11.

In FIG. 11, the dotted line indicates that the transition of state is optional, or the transition of state will have to go through another intermediate state, like cell selection and/or L2 U2N relay selection.

Embodiment 11 takes Embodiment 8 as the foundation, so that embodiments below in Embodiment 11 can be combined with embodiments given in Embodiment 8.

Embodiments given in Embodiment 11 can be combined with at least partial embodiments in Embodiment 9, and embodiments given in Embodiment 11 can be arbitrarily combined with at least partial embodiments in Embodiment 10.

In Embodiment 11, the first state is not the camped normally state.

In Embodiment 11, the second state is not the connected mode.

In one embodiment, a third state in FIG. 11 is any cell selection state.

In one embodiment, a third state in FIG. 11 is one of {any relay selection state, any L2 U2N relay selection state, out-of-coverage state, any cell and relay selection state, any cell and L2 U2N relay selection state, any selection state, any access point selection state}.

In one embodiment, the first state is one of {relay camped state, relay state, L2 U2N relay connected state, cell-camped state via relay, normally relay camped state, camped state via L2 U2N relay, camped normally state via relay, indirect camped state, indirect camped state}.

In one embodiment, the second state is one of {connected mode via relay, connected mode via L2 U2N relay, indirect connected mode, indirectly connected mode}.

In one embodiment, the condition for entering the normal camping mode includes finding a suitable cell.

In one subembodiment, the suitable cell shall satisfy the criterion S.

In one subembodiment, the suitable cell shall satisfy the first quality criterion.

In one embodiment, in the connected mode, the RRC connection of the first node is directly established without being relayed.

In one embodiment, in the connected mode, the first node initiates establishment of an RRC connection or the RRC connection establishment is completed.

In one embodiment, the condition for entering the connected mode includes that an RRC connection is directly established without being relayed.

In one embodiment, in the second state, the first node establishes an RRC connection to the network via the first relay.

In one subembodiment, the first relay is a suitable L2 U2N relay.

In one embodiment, the transition between the first state and the camped normally state can refer to Embodiment 9.

In one embodiment, the transition between the second state and the connected mode can refer to Embodiment 10.

In one embodiment, the transition from the second state to the third state can refer to Embodiment 10.

In one embodiment, when the first node in a camped normally state needs to enter an RRC connected mode, it moves to the connected mode.

In one embodiment, after the first node in a camped normally state enters an RRC connected mode, it moves to the connected mode.

In one embodiment, after leaving from the connected mode, the first node performs cell selection and finds a suitable cell, and then enters the camped normally state.

In one embodiment, when the first node transits from the second mode, the first node performs L2 U2N relay selection and finds a suitable L2 U2N relay, and then enters the first state.

In one subembodiment, a trigger for the first node's being away from the second node includes: an RRC connection of the first node is released.

In one subembodiment, a trigger for the first node's being away from the second node includes: the first node finishes a session.

In one subembodiment, a trigger for the first node's being away from the second node includes: a first timer of the first node is expired.

In one subembodiment, a trigger for the first node's being away from the second node includes: an RLF occurs.

In one subembodiment, a trigger for the first node's being away from the second node includes: an instruction from the network is received.

In one subembodiment, a trigger for the first node's being away from the second node includes: an indication of the first relay is received.

In one embodiment, when the first node transits from the second state, the first node performs cell selection and finds a suitable cell, and it then enters the camped normally state.

In one subembodiment, before the action of performing cell selection the first node performs L2 U2N relay selection, through which no suitable relay is found.

In one subembodiment, when the first node transits from the second state, the first node performs cell selection and L2 U2N relay selection, through which no suitable relay is found.

In one embodiment, the first node in the camped normally state needs to establish an RRC connection, so it moves to the second state.

In one subembodiment, the phrase of needing to establish an RRC connection includes NAS triggering.

In one subembodiment, the phrase of needing to establish an RRC connection includes registering and receiving a paging message from the PLMN.

In one subembodiment, the phrase of needing to establish an RRC connection includes registering and receiving a paging message from the SNPN.

In one subembodiment, the phrase of needing to establish an RRC connection includes needing to perform RAN notification area (RNA) update.

In one subembodiment, the cell on which the first node is camped is no longer suitable.

In one subembodiment, the first node finds a suitable L2 U2N relay.

In one embodiment, when the first node transits from the second state, the first node performs cell selection and finds a suitable cell, and then moves to the camped normally state.

In one embodiment, when the first node transits from the second state, the first node performs cell selection and L2 U2N relay selection and finds a suitable cell but no suitable L2 U2N relay, and then moves to the camped normally state.

In one embodiment, when the first node transits from the second state, the first node performs cell selection and L2 U2N relay selection and finds a suitable cell and also a suitable L2 U2N relay, and then moves to the camped normally state.

In one subembodiment, the first node determines to be switched to the camped normally state according to internal algorithm.

In one embodiment, when the first node transits from the second state, the first node performs cell selection and L2 U2N relay selection and finds a suitable cell, and the cell found meets the first quality requirement, it then moves to the camped normally state.

In one subembodiment, for the first quality requirement, refer to Embodiment 9.

In one subembodiment, when there is a cell that meets the first quality requirement, the first node cannot use L2 U2N relay.

In one subembodiment, when there is a suitable cell that meets the first quality requirement, the first node cannot use L2 U2N relay.

In one subembodiment, when there is a suitable cell that meets the first quality requirement, the first node cannot use L2 U2N relay to connect with the network.

In one embodiment, the first node cannot switch directly from the camped normally state to the second state.

In one embodiment, the first node can only switch from the camped normally state to the first state and then to the second state.

In one embodiment, the first node can switch directly from the camped normally state to the second state.

In one embodiment, when the first node is in the first state and needs to establish an RRC connection, the first node moves from the first state to the connected mode.

In one subembodiment, the phrase of needing to establish an RRC connection includes NAS triggering.

In one subembodiment, the phrase of needing to establish an RRC connection includes registering and receiving a paging message from the PLMN.

In one subembodiment, the phrase of needing to establish an RRC connection includes registering and receiving a paging message from the SNPN.

In one subembodiment, the phrase of needing to establish an RRC connection includes needing to perform RAN notification area (RNA) update.

In one subembodiment, the L2 U2N relay used by the first node in the first state is no longer a suitable L2 U2N relay.

In one subembodiment, there is at least one cell whose quality satisfies the first quality requirement.

In one subembodiment, there is at least one suitable cell whose quality satisfies the first quality requirement.

In one subembodiment, for the first quality requirement, refer to Embodiment 9.

In one subembodiment, when there is a cell that meets the first quality requirement, the first node cannot use L2 U2N relay.

In one subembodiment, when there is a suitable cell that meets the first quality requirement, the first node cannot use L2 U2N relay to connect with the network.

In one subembodiment, the first node finds a suitable cell.

In one subembodiment, the first node finds a suitable cell that satisfies the first quality requirement.

In one embodiment, the first node is in the camped normally state, when the cell on which the first node is camped is no longer suitable, the first node performs cell selection and finds no suitable cell, then it moves to the third state.

In one embodiment, the first node is in the camped normally state, when the cell on which the first node is camped is no longer suitable, the first node performs cell selection and L2 U2N relay selection, through which neither a suitable cell nor a suitable L2 U2N relay is found, then it moves to the third state.

In one embodiment, the first node is in the camped normally state, when a NAS of the first node indicates that registering at a selected PLMN or a selected SNPN is rejected, the first node enters the third state.

In one embodiment, the first node is in the camped normally state, when the cell on which the first node is camped is no longer suitable, the first node performs cell selection and finds no suitable cell, and then it moves to any cell selection state.

In one embodiment, the first node is in the camped normally state, when the cell on which the first node is camped is no longer suitable, the first node performs cell selection, through which no suitable cell is found, and performs L2 U2N relay selection, through which no suitable L2 U2N relay is found, then it moves to any cell selection state.

In one embodiment, the first node is in the camped normally state, when the cell on which the first node is camped is no longer suitable, the first node performs L2 U2N relay selection, through which no suitable L2 U2N relay is found, then it moves to the third state.

In one embodiment, the first node performs cell re-selection assessment and finds a suitable cell; and as a response to the action of performing cell re-selection assessment and finding a suitable cell, moves from the first state to a camped normally state;

herein, when in the second state, the RRC connection is established via the first relay; the second state is a state other than a connected mode, where when in the connected mode, the RRC connection is directly established without being relayed.

In one subembodiment, the first node does not find any suitable L2 U2N relay.

In one subembodiment, the first node finds a suitable cell that satisfies the first quality requirement, for the first quality requirement, refer to Embodiment 9.

In one embodiment, the first node is in the third state, the first node performs cell selection and finds a suitable cell, and then moves to a camped normally state.

In one subembodiment, the third state is any cell selection state.

In one subembodiment, the third state is not any cell selection state.

Embodiment 12

Figure 12:
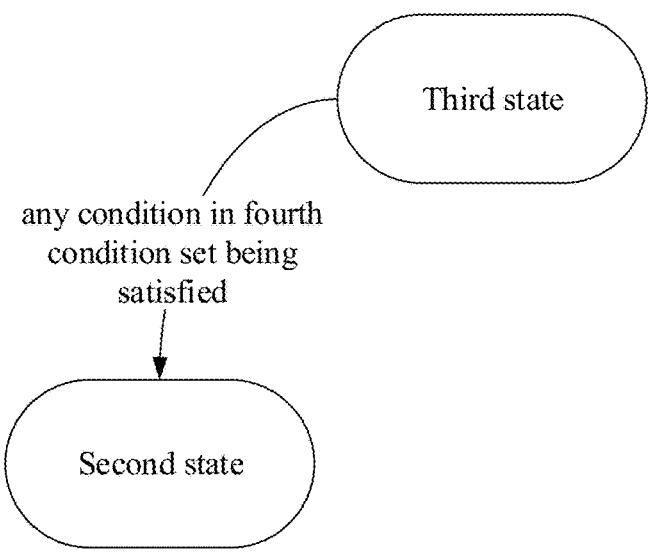
FIG. 12 illustrates a schematic diagram of state transition according to one embodiment of the present application.

Embodiment 12 illustrates a schematic diagram of state transition according to one embodiment of the present application, as shown in FIG. 12.

In one embodiment, a third state in FIG. 12 is any cell selection state.

In one embodiment, a third state in FIG. 12 is one of {any relay selection state, any L2 U2N relay selection state, out-of-coverage state, any cell and relay selection state, any cell and L2 U2N relay selection state, any selection state, any access point selection state}.

In one embodiment, the first node, as a response to any condition in a fourth condition set being satisfied, moves from the any cell selection state to the second state;

herein, the fourth condition set at least comprises: a condition of finding a suitable L2 relay and needing to establish an RRC connection, the third state being the any cell selection state.

In one subembodiment, the phrase of finding a suitable L2 relay refers to finding a suitable L2 U2N relay.

In one subembodiment, the phrase of needing to establish an RRC connection includes NAS triggering.

In one subembodiment, the phrase of needing to establish an RRC connection includes needing to transmit emergency traffics.

In one subembodiment, the phrase of needing to establish an RRC connection includes registering and receiving a paging message from the PLMN.

In one subembodiment, the phrase of needing to establish an RRC connection includes registering and receiving a paging message from the SNPN.

In one subembodiment, the phrase of needing to establish an RRC connection includes needing to perform RAN notification area (RNA) update.

In one subembodiment, the phrase of needing to establish an RRC connection includes needing to establish an RRC connection to transmit data.

In one subembodiment, the first node can switch directly from the any cell selection state to the second state.

In one subembodiment, in the any cell selection state, there is an unsuitable and unacceptable cell whose quality meets the first quality requirement, the first quality requirement referring to Embodiment 9.

In one subembodiment, in the any cell selection state, there is an unsuitable and unacceptable cell whose quality meets the first quality requirement, and there exists a cell that satisfies the first quality requirement to be used to determine that L2 U2N relay cannot be used.

Embodiment 13

Figure 13:
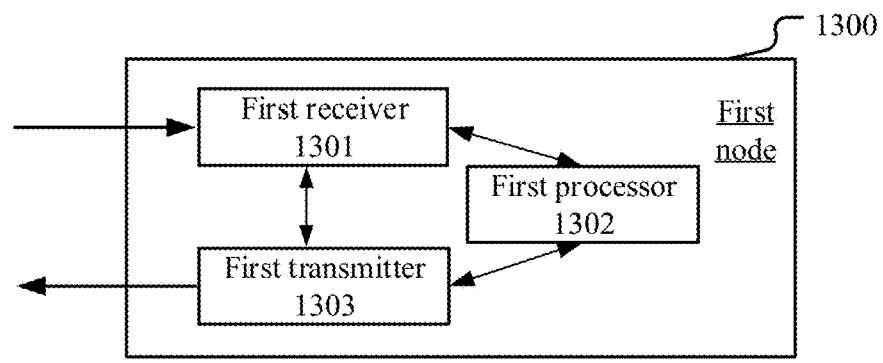
FIG. 13 illustrates a structure block diagram of a processing device in a first node according to one embodiment of the present application.

FIG. 13 illustrates a structure block diagram of a processing device used in a first node according to one embodiment of the present application; as shown in FIG. 13. In FIG. 13, a processing device 1300 in a first node comprises a first receiver 1301, a first processor 1302 and a first transmitter 1303.

In Embodiment 13, the first receiver 1301 enters a first state, as a response to any condition in a first condition set being satisfied; and performs a first operation set in the first state;

the first processor 1302 moves from the first state to a second state, as a response to any condition in a second condition set being satisfied; and as a response to any condition in a third condition set being satisfied, moves from the first state to any cell selection state;

herein, the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving a paging message from a registered PLMN or SNPN; the third condition set at least comprises one condition of performing re-selection assessment, through which neither a suitable cell nor a suitable L2 relay is found; in the second state, an RRC connection is established.

In one embodiment, the first state is a camped normally state, the first condition set comprising a condition of finding a suitable cell.

In one embodiment, the first receiver 1301 performs cell re-selection assessment and finds a suitable cell; and as a response to the action of performing cell re-selection assessment and finding a suitable cell, moves from the first state to a camped normally state;

herein, when in the second state, the RRC connection is established via the first relay; the second state is a state other than a connected mode, where when in the connected mode, the RRC connection is directly established without being relayed.

In one embodiment, the first receiver 1301 receives a first signaling; and as a response to receiving the first signaling, moves from the second state to a connected mode;

herein, when in the second state, the RRC connection is established via the first relay; when in the connected mode, the RRC connection is directly established without being relayed.

In one embodiment, the first receiver 1301, before the action of entering the first state, performs cell re-selection assessment and finds no cell that satisfies a first quality criterion;

herein, the first state is a camped normally state; under the assumption that L2 relay is not used: a suitable cell is a cell that satisfies the first quality criterion and the condition for entering the camped normally state includes a suitable cell being found, and the first node entering the any cell selection state.

In one embodiment, the first receiver 1301, before the action of moving from the first state to a second state, receives a first signal on a sidelink, the first signal being used to indicate a first cell, and determines the first cell to be a camped cell of the first node;

herein, when the first relay is in an RRC connected state, the first cell is a PCell of the first relay; when the first relay is not in an RRC connected state, the first cell is a serving cell of the first relay.

In one embodiment, the first receiver 1301 determines a first cell to be a suitable cell according to a second criterion; the first cell does not satisfy a first quality criterion;

herein, under the assumption that L2 relay is not used, a suitable cell is a cell that satisfies the first quality criterion; the second criterion includes: the first relay is a suitable L2 relay, and the first cell is a suitable cell for the first relay, the first cell is not barred, the first cell belonging to a selected or registered or equivalent PLMN; the condition for entering the first state includes finding a suitable cell.

In one embodiment, the first receiver 1301, before the action of entering the first state, performs cell re-selection assessment and finds no cell that satisfies a first quality criterion;

herein, a suitable cell is a cell that satisfies the first quality criterion.

In one embodiment, the first processor 1302, as a response to any condition in a fourth condition set being satisfied, moves from the any cell selection state to the second state;

herein, the fourth condition set at least comprises: a condition of finding a suitable L2 relay and needing to establish an RRC connection.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a piece of equipment supporting transmissions with low delay and high reliability.

In one embodiment, the first node is a sidelink communication node.

In one embodiment, the first receiver 1301 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1303 comprises at least one of the antenna 452, the transmitter 454, the transmitting processor 468, the multi-antenna transmitting processor 457, the controller/processor 459, the memory 460 or the data source 467 in Embodiment 4.

Embodiment 14

Figure 14:
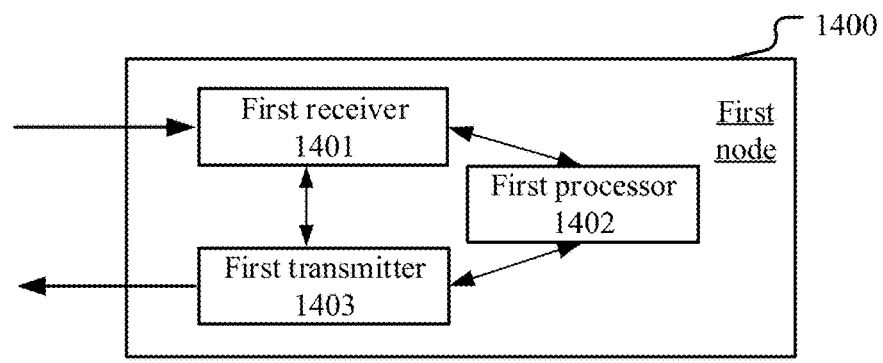
FIG. 14 illustrates a structure block diagram of a processing device in a first node according to one embodiment of the present application.

FIG. 14 illustrates a structure block diagram of a processing device used in a first node according to one embodiment of the present application; as shown in FIG. 14. In FIG. 14, the processing device 1400 in a first node comprises a first receiver 1401, a first processor 1402 and a first transmitter 1403.

In Embodiment 14, the first receiver 1401 enters a first state, as a response to any condition in a first condition set being satisfied; and performs a first operation set in the first state;

the first processor 1402 moves from the first state to a second state, as a response to any condition in a second condition set being satisfied; moves from the first state to a third state, as a response to any condition in a third condition set being satisfied;

herein, the first operation set comprises: listening over paging via a first relay, and listening over related system information via the first relay, and performing re-selection assessment; the first condition set at least comprises one condition of finding a suitable L2 relay, the first relay being a said suitable L2 relay; the second condition set at least comprises one condition of receiving paging messages from a registered PLMN or SNPN; the third condition set at least comprises one condition of performing re-selection assessment, through which not a suitable L2 relay is found; in the second state, an RRC connection is established.

In one embodiment, the L2 relay is a L2 U2N relay.

In one embodiment, the first relay is a suitable L2 U2N relay.

In one embodiment, the first state is a camped normally state.

In one embodiment, the first condition set comprises one condition of finding a suitable cell.

In one embodiment, the performing re-selection assessment includes at least one of performing cell selection, performing relay selection, performing L2 U2N relay selection, performing L2 relay selection, performing cell re-selection assessment, performing L2 relay re-selection assessment, performing L2 U2N relay re-selection assessment or performing L2 relay re-selection assessment.

In one embodiment, the third state is any cell selection state.

In one embodiment, the third state isn't any cell selection state.

In one embodiment, the third state is one state among {any relay cell selection state, any L2 U2N relay selection state, any access node selection state, any L2 relay selection state, L2 relay selection state, L2 U2N relay selection state, any L2 relay and cell selection state, any L2 U2N relay and cell selection state, any cell selection and relay selection state, any cell selection and L2 relay selection state, any cell selection and L2 U2N relay selection state}.

In one embodiment, the first receiver 1401 performs cell re-selection assessment and finds a suitable cell; and as a response to the action of performing cell re-selection assessment and finding a suitable cell, moves from the first state to a camped normally state;
herein, when in the second state, the RRC connection is established via the first relay; the second state is a state other than a connected mode, where when in the connected mode, the RRC connection is directly established without being relayed.

In one embodiment, the first receiver 1401 receives a first signaling; and as a response to receiving the first signaling, moves from the second state to a connected mode;
herein, when in the second state, the RRC connection is established via the first relay; when in the connected mode, the RRC connection is directly established without being relayed.

In one embodiment, at least one of the first state, the second state or the third state is related to cell re-selection.

In one embodiment, the first state, the second state and the third state are respectively mobility-related states.

In one embodiment, the first receiver 1401, before the action of entering the first state, performs cell re-selection assessment and finds no cell that satisfies a first quality criterion;
herein, the first state is a camped normally state; under the assumption that L2 relay is not used: a suitable cell is a cell that satisfies the first quality criterion and the condition for entering the camped normally state includes a suitable cell being found, and the first node entering the third state.

In one embodiment, the first receiver 1401, before the action of moving from the first state to a second state, receives a first signal on a sidelink, the first signal being used to indicate a first cell, and determines the first cell to be a camped cell of the first node;
herein, when the first relay is in an RRC connected state, the first cell is a PCell of the first relay; when the first relay is not in an RRC connected state, the first cell is a serving cell of the first relay.

In one embodiment, the first receiver 1401 determines a first cell to be a suitable cell according to a second criterion; the first cell does not satisfy a first quality criterion;
herein, under the assumption that L2 relay is not used, a suitable cell is a cell that satisfies the first quality criterion; the second criterion includes: the first relay is a suitable L2 relay, and the first cell is a suitable cell for the first relay, the first cell is not barred, the first cell belonging to a selected or registered or equivalent PLMN; the condition for entering the first state includes finding a suitable cell.

In one embodiment, the first receiver 1401, before the action of entering the first state, performs cell re-selection assessment and finds no cell that satisfies a first quality criterion;
herein, a suitable cell is a cell that satisfies the first quality criterion.

In one embodiment, the first processor 1402, as a response to any condition in a fourth condition set being satisfied, moves from the third state to the second state;
herein, the fourth condition set at least comprises: a condition of finding a suitable L2 relay and needing to establish an RRC connection.

In one embodiment, the first node is a UE.

In one embodiment, the first node is a terminal supporting large delay difference.

In one embodiment, the first node is a terminal supporting NTN.

In one embodiment, the first node is an aircraft.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a piece of equipment supporting transmissions with low delay and high reliability.

In one embodiment, the first node is a sidelink communication node.

In one embodiment, the first receiver 1401 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1403 comprises at least one of the antenna 452, the transmitter 454, the transmitting processor 468, the multi-antenna transmitting processor 457, the controller/processor 459, the memory 460 or the data source 467 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present application includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment.

This disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver; and a first processor,
the first node configured to:
enter a first state, in response to any condition in a first condition set being satisfied;
perform a first operation set in the first state;
move from the first state to a second state, in response to any condition in a second condition set being satisfied, wherein the second state is a state other than a connected mode;
establish a radio resource control (RRC) connection while in the second state and
move from the first state to any cell-selection state in response to any condition in a third condition set being satisfied,
wherein the first operation set comprises listening over paging via a first relay, listening over related system information via the first relay, and performing re-selection assessment,
wherein the first condition least comprises finding a suitable layer 2 (L2) relay, the first relay being the suitable L2 relay,
wherein the second condition set comprises receiving paging messages from a registered Public Land Mobile Network (PLMN) or Stand-alone Non-Public Network (SNPN), and
wherein the third condition set comprises performing re-selection assessment, through which neither a suitable cell nor the suitable L2 relay is found.

2. The first node according to claim 1, wherein the first state is a camped normally state, and the first condition set further comprises finding the suitable cell.

3. The first node according to claim 1,
wherein the first node is further configured to:
perform cell re-selection assessment and find the suitable cell; and
in response to performing the cell re-selection assessment and finding the suitable cell, move from the first state to a camped normally state, and
wherein when in the second state, the RRC connection is established via the first relay.

4. The first node according to claim 3,
wherein the first node is further configured to:
receive a first signaling; and
in response to receiving the first signaling, move from the second state to the connected mode, and
wherein when in the second state, the RRC connection is established via the first relay, and when in the connected state, the RRC connection is directly established without being relayed.

5. The first node according to claim 3,
wherein the first node is configured to before moving from the first state to the second state, receive a first signal on a sidelink, the first signal being used to indicate a first cell, and determine the first cell to be a camped cell of the first node, and
wherein when the first relay is in the RRC connected state, the first cell is a primary cell (PCell) of the first relay, and when the first relay is not in the RRC connected state, the first cell is a serving cell of the first relay.

6. The first node according to claim 1,
wherein the first node is further configured to:
receive a first signaling; and
in a response to receiving the first signaling, move from the second state to a connected mode, and
wherein when in the second state, the RRC connection is established via the first relay, and when in the connected mode, the RRC connection is directly established without being relayed.

7. The first node according to claim 1,
wherein the first node is configured to, before entering the first state, perform cell re-selection assessment, having found no cell that satisfies a first quality criterion,
wherein the first state is a camped normally state, and
wherein when the L2 relay is not used, (i) the suitable cell satisfies the first quality criterion and (ii) a condition for entering the camped normally state includes the suitable cell being found, and the first node entering the any cell-selection state.

8. The first node according to claim 1,
wherein the first node is configured to before moving from the first state to the second state, receive a first signal on a sidelink, the first signal being used to indicate a first cell, and determine the first cell to be a camped cell of the first node, and
wherein when the first relay is in the RRC connected state, the first cell is a primary cell (PCell) of the first relay, and when the first relay is not in the RRC connected state, the first cell is a serving cell of the first relay.

9. The first node according to claim 8,
wherein the first node is configured to determine the first cell to be the suitable cell according to a second criterion,
wherein the first cell does not satisfy a first quality criterion,
wherein when the L2 relay is not used, the suitable cell satisfies the first quality criterion,
wherein the second criterion includes the first relay is the suitable L2 relay, and one or more of the first cell is the suitable cell for the first relay, the first cell is not barred, the first cell belonging to a selected or registered or equivalent PLMN, and wherein the condition for entering the first state includes finding the suitable cell.

10. The first node according to claim 8, wherein the first receiver is configured to, before the action of entering the first state, perform cell re-selection assessment, having found no cell that satisfies a first quality criterion; and wherein the suitable cell satisfies the first quality criterion.

11. The first node according to claim 10, wherein the first node is configured to, in response to any condition in a fourth condition set being satisfied, move from the any cell-selection state to the second state, and wherein the fourth condition set comprises a condition of finding the suitable L2 relay and needing to establish the RRC connection.

12. The first node according to claim 10, wherein the first node is configured to enter the third state, wherein the first node is configured to, while in the third state, perform cell selection and find the suitable cell, wherein, subsequent to the third state, the first node is configured to move to a camped normally state, and wherein the third state comprises one of any relay cell selection state, any L2 user equipment to network (U2N) relay selection state, any access node selection state, any L2 relay selection state, an L2 relay selection state, an L2 U2N relay selection state, any L2 relay and cell selection state, any L2 U2N relay and a cell selection state, any cell selection and relay selection state, any cell selection and the L2 relay selection state, any cell selection or the L2 U2N relay selection state.

13. The first node according to claim 10, wherein the first node is configured to be in an RRC_IDLE state.

14. The first node according to claim 1, wherein the first node is configured to determine a first cell to be the suitable cell according to a second criterion, wherein the first cell does not satisfy a first quality criterion, wherein when the L2 relay is not used, the suitable cell satisfies the first quality criterion, wherein the second criterion includes the first relay is the suitable L2 relay, and one or more of the first cell is the suitable cell for the first relay, the first cell is not barred, the first cell belonging to a selected or registered or equivalent PLMN, and wherein the condition for entering the first state includes finding the suitable cell.

15. The first node according to claim 1, wherein the first receiver is configured to, before the action of entering the first state, perform cell re-selection assessment, having found no cell that satisfies a first quality criterion, and wherein the suitable cell satisfies the first quality criterion.

16. The first node according to claim 1, wherein the first node is configured to, in response to any condition in a fourth condition set being satisfied, move from the any cell-selection state to the second state, and wherein the fourth condition set comprises a condition of finding the suitable L2 relay and needing to establish the RRC connection.

17. The first node according to claim 1, wherein the action of performing re-selection assessment includes performing an L2 user equipment to network (U2N) relay selection and/or re-selection procedure, and wherein a triggering condition for performing the L2 U2N relay selection and/or re-selection procedure includes a release or failure of a link between the first node and the first relay.

18. The first node according to claim 1, wherein when the first node is in the first state, and any condition in the second condition set is satisfied, the first node is configured to transit from the first state to the second state, and wherein the second condition set comprises leaving or having to leave an idle or inactive mode.

19. The first node according to claim 1, wherein the first node is configured to be in an RRC_IDLE state.

20. A method in a first node for wireless communications, comprising:

entering a first state, as a in response to any condition in a first condition set being satisfied;

performing a first operation set in the first state;

moving from the first state to a second state, in response to any condition in a second condition set being satisfied, wherein the second state is a state other than a connected mode;

establishing a radio resource control (RRC) connection while in the second state; and in response to any condition in a third condition set being satisfied, moving from the first state to any cell-selection state, wherein the first operation set comprises listening over paging via a first relay, listening over related system information via the first relay, and performing re-selection assessment, wherein the first condition set comprises finding a suitable layer 2 (L2) relay, the first relay being the suitable L2 relay, wherein the second condition set comprises receiving paging messages from a registered Public Land Mobile Network (PLMN) or Stand-alone Non-Public Network (SNPN), and wherein the third condition set comprises performing re-selection assessment, through which neither a suitable cell nor the suitable L2 relay is found.

* * * * *